INVENTORS
JOHN L. BOTJER
EDWARD O. DONNER
HAROLD E. FRYE
HOWARD S. KEELER
BY *Thomas & Thomas*
ATTORNEYS July 1, 1969 E. O. DONNER ET AL 3,453,384

DISPLAY SYSTEM WITH INCREASED MANUEL INPUT DATA RATE

Filed Dec. 7, 1965 Sheet 5 of 10

3,453,384
DISPLAY SYSTEM WITH INCREASED MANUAL INPUT DATA RATE

Edward O. Donner, Poughkeepsie, Howard S. Keeler, Wappingers Falls, John L. Botjer, Hyde Park, and Harold E. Frye, Wappingers Falls, N.Y., assignors to International Business Machines Corporation, Armonk, N.Y., a corporation of New York Filed Dec. 7, 1965, Ser. No. 512,106
Int. Cl. H04n 3/00
U.S. Cl. 178—6.8 12 Claims

ABSTRACT OF THE DISCLOSURE

A display system includes a data processing device, a composer, and a plurality of terminals with each terminal having a keyboard, a cyclical storage device, and a TV display device. The composer receives coded digital signals representing a character and converts them to equivalent video signals of the same character. A switch mechanism selectively connects the composer between the keyboard and the cyclical storage device of each terminal, but the composer is disconnected automatically after one character has been accepted from any keyboard. The switch mechanism may connect the composer between the data processing device and the cyclical storage device of a selected terminal. A message may be typed, displayed, and verified at a given terminal, and then the message may be transmitted to the data processing device where an answer may be determined, transferred and displayed at the corresponding terminal.

*Cross-references to related applications*

Patent 3,413,615, application Serial 487,887 filed September 16, 1965, for Delay Line Buffer Storage Circuit by John L. Botjer et al.

*Background of the invention*

(1) This invention relates to display systems and more particularly to display systems employed in terminal equipment associated with a data processing system.

(2) In earlier types of display systems which utilize a composer to convert coded digital signals from one or more keyboards to video signals for visual presentation on one or more display devices, it has been customary for a given one of a plurality of stations to be able to monopolize the composer for an entire message. If ten or more terminals are ready at the same time to use the composer, one terminal is selected to use the composer to transmit an entire message, and the remaining nine must wait. Next, one of the nine stations is selected to transmit an entire message while the remaining eight terminals must wait. The process continues until all terminals have been serviced. The last stations to be selected may undergo an exceedingly long delay.

*Summary of the invention*

Accordingly, it is a feature of this invention to provide an improved arrangement wherein a composer is allotted on a single symbol basis to each one of a plurality of terminals in turn. A symbol is a letter, numeral or special character. There are various efficiencies derived from an improved system of this type. First, when a plurality of terminals are each permitted to transmit a single symbol in turn, the data rate to the composer is increased, and the composer is utilized more efficiently. Second, an improved system according to this invention permits operators at ten terminals, for example, to type their messages simultaneously, and the time of the operators is more efficiently used since none of them is kept waiting. This result is obtained because the speed at which the composer operates and the speed at which it may be switched from terminal to terminal is much greater than the speed at which operators at a plurality of terminals manually may supply sets of digital signals representing single symbols.

Accordingly, it is a feature of this invention to provide an improved display system wherein a composer is switched from terminal to terminal and converts only one set of coded digital signals to video signals at each station at a time.

It is another feature of this invention to provide an improved display system for use with a data processing system wherein a plurality of messages may be typed, displayed and verified by operators at a plurality of terminals before being forwarded to a data processing system and answers, if required, are determined, transferred from the data processing system to the terminals, and displayed for viewing by the operators.

It is still another feature of this invention to provide an improved display system which has a plurality of terminals with each terminal including a cyclical storage device and a display device wherein the time period of one cycle of the cyclical storage device is equal to the time perod of one complete picture frame including the retrace periods.

It is another feature of this invention to provide an improved display system which uses a plurality of terminals each including a cyclical storage device and a display device having the same cycle period, and marker bits are used in each of the cyclical storage devices for synchronization purposes and for locating the position of the signals last stored therein.

It is a feature of this invention to provide an improved display system which is relatively simple in construction and hence economical to manufacture and maintain.

In one arrangement according to the present invention an improved display system is provided which has a plurality of terminals with each terminal having a keyboard, a cyclical storage device, and a display device. The cyclical storage device has a time period equal to the time period of one picture frame of the display device. The composer is connected to each of the stages successively, and each station is afforded an opportunity to supply coded digital signals from the keyboard to the composer which in turn supplies video signals which are stored in the cyclical storage device. The symbol represented by each set of the coded digital signals is visually presented on the display device, and a plurality of such symbols form a message on the display device. The cyclical storage devices at the various terminals may be selectively connected to transfer sets of coded digital signals to a computer or data processing device, and coded digital signals from the data processing device may be supplied to the composer which converts these signals to video signals and supplies them to a selected terminal for storage in the cyclical storage. The data processing device executes its data transfers at high speed, and its data transfers to and from the terminals provide very little interruption, if any, to the terminal keyboards in their use of the composer. Thus a message may be typed, displayed, verified and then transmitted to a data processing system, and an answer may be determined, transferred and displayed at a terminal.

The foregoing and other objects, features and advantages of the invention will be apparent from the following more particular description of a preferred embodiment of the invention, as illustrated in the accompanying drawings.

*Description of the preferred embodiment*

Figure 1:
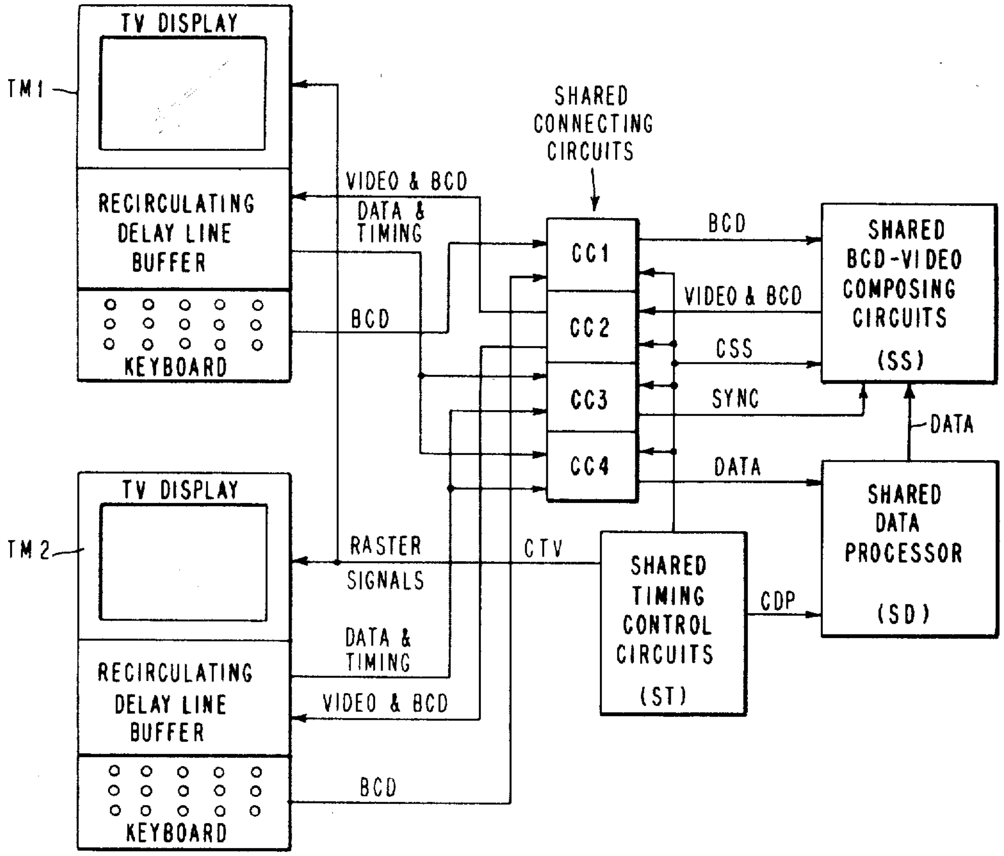
FIGURE 1 is a general block diagram illustrating a preferred embodiment of this invention.

The reference is made to FIGURE 1 which illustrates multiple display terminals TM-1 and TM-2 with each including a keyboard, a TV display and a recirculating buffer storage device. The keyboard provides for manual selection of symbols including letters, numerals and special characters. The TV display includes a television tube which is provided with the customary raster that is generated by signals from horizontal and vertical sweep circuits, and the TV display also includes circuits for horizontal and vertical synchronization, horizontal and vertical retrace or blank-unblank control signals, and modulation or video signals for generating a visual display. The buffer storage device is a delay line storage arrangement which includes provision for continuously recirculating signals stored therein. The period of the delay line buffer, the transit time of a signal through the delay line, is selected to be equal to the period of time required to generate a raster including the necessary time required for a horizontal and vertical retrace.

Keyboard characters are converted at each station TM to coded electrical pulses in a binary coded decimal (BCD) system of notation. For purposes of illustration it is assumed that the binary coded decimal format employed is 1, 2, 4, 8, A, B, C. Binary signals in this format are supplied in parallel from the keyboard to common connecting circuits CC which translate the keyed data signals to time shared composing circuits SS. The composing circuits SS convert the binary coded decimal characters in parallel form to binary coded decimal characters in serial form suitable for storage in the recirculating delay line buffer. The composing circuits also convert the binary coded decimal characters in parallel form to video signals which are supplied in serial form for storage in the recirculating delay line buffer. The video signals are binary dot or pulse elements which are synchronized with appropriate dot areas of the raster, and they are employed to modulate the electron beam of the TV display tube thereby to generate a visual representation of the symbol represented. Each delay line buffer has a recirculation period synchronized with a picture frame cycle or raster of the corresponding TV display, and it accumulates characters one at a time from the composing circuits SS. The output of each delay line buffer is coupled directly to the video controls of the associated TV receiver for continuously displaying the accumulated video signals.

All of the TV displays have their line rasters synchronized with respect to clock signals CTV supplied from shared timing control circuits ST. The shared timing control circuits ST also supply clock signals CSS and CDP, having a fixed timed relationship to the signals CTV, to the composing circuits SS which are timed shared by all terminals TM on a single character basis, and to a data processor SD which may communicate with each one of the terminals TM. Binary coded decimal signals accumulated in the delay line buffers at each terminal TM may be forwarded to the data processor SD for processing via the common connecting circuits after visual verification of the correctness of the data at the TV display of the originating station.

The shared connecting circuits include circuits CC 1 through CC 4. The connecting circuit CC 1 takes binary coded decimal signals from the keyboard of each station TM in turn and supplies them to the composing circuits SS. These signals are supplied in parallel form. After the composing circuit SS converts the BCD signals in parallel form to video and BCD signals in serial form, they are supplied through shared connecting circuits CC 2 to the delay line buffer of the associated terminal TM. Data accumulated in the delay line buffers may be located by marker bits which may be forwarded via common connecting circuit CC 3 to the composing circuits SD for synchronization purposes. This insures that new data supplied by the composing circuit SS to the delay line buffers of the various terminals TM is properly synchronized. Data accumulated in the delay line buffers of the various terminals TM may be forwarded via common connecting circuits CC 4 to a data processor for processing after the data has been visually verified for correctness at the TV display of the originating station. Processed data from the data processor SD may be supplied as binary coded decimal signals in parallel form to the composing circuits SS where it is converted to video and transmitted through shared connecting circuits CC 2 to the originating terminal where such processed data may be displayed.

The shared timing control circuits ST control the coordination and synchronization of all units in FIGURE 1. Thus the TV displays, the delay lie buffers, the composing circuits SS and the shared connecting circuits CC are synchronized with respect to each other. The shared timing control circuits ST also coordinate the transfer of data to and from the data processor SD.

The keyboards at the various terminals are manipulated by operators, and thus binary coded data is supplied at random times to the shared connecting circuit CC 1. The keyboards of the various terminals are polled or sampled at such a rate and the resulting storage and display of the typed characters is completed at such a rapid speed by the common electrical equipment that the manual entry of data from the keyboards by the most skillful and fastest operators can be handled with ease. The shared connecting circuits CC, the shared composing circuits SS, the shared data processor SD and the shared timing control circuits ST operate at electronic speed and perform their functions in a few microseconds; whereas, the fastest operator at the keyboard manipulates the keys at a few millisecond speeds at best. Thus, a plurality of terminals TM may be operated simultaneously to display and store different messages using shared circuits which operate at high speeds on a one character basis from each terminal in turn. Control keys are provided at each keyboard to permit an operator to delete or cancel displayed information and to transmit to the data processor information which the operator has verified to be correct. This permits flexibility in drafting messages for the data processor. When an inquiry is made of the data processor, the answer is rapidly derived by the data processor and transferred through the common electrical equipment including the composing circuits and connecting circuits to the originating station where it is stored and displayed for immediate review by the operator.

Figure 5:
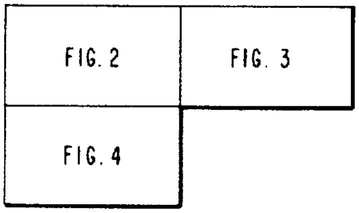
FIGURE 5 illustrates the manner in which FIGURE 2 through 4 should be physically arranged with respect to each other.
Figure 2:
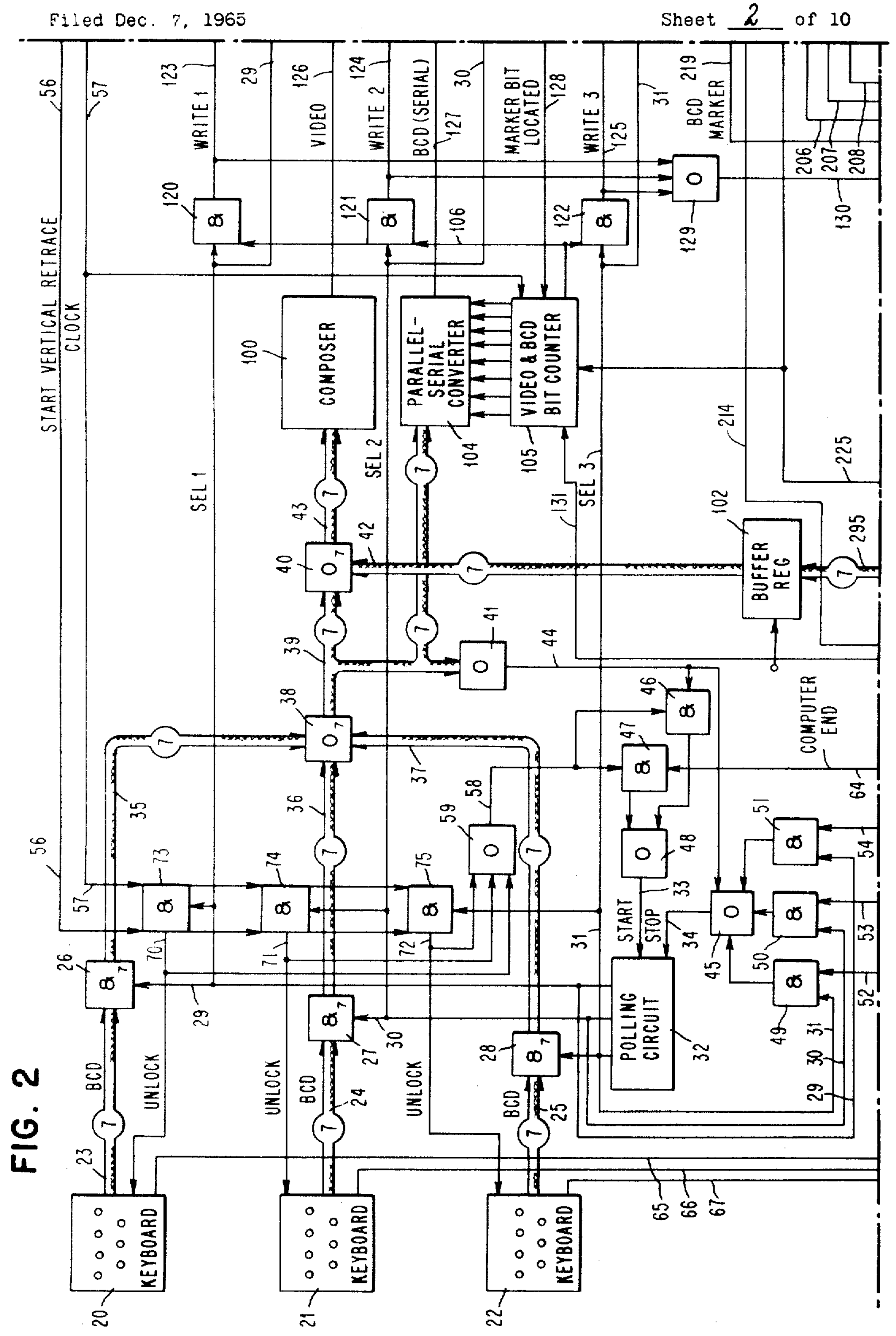
FIGURE 2 is a block diagram schematic representing the data flow and control functions of the apparatus illustrated in FIGURE 1.
Figure 3:
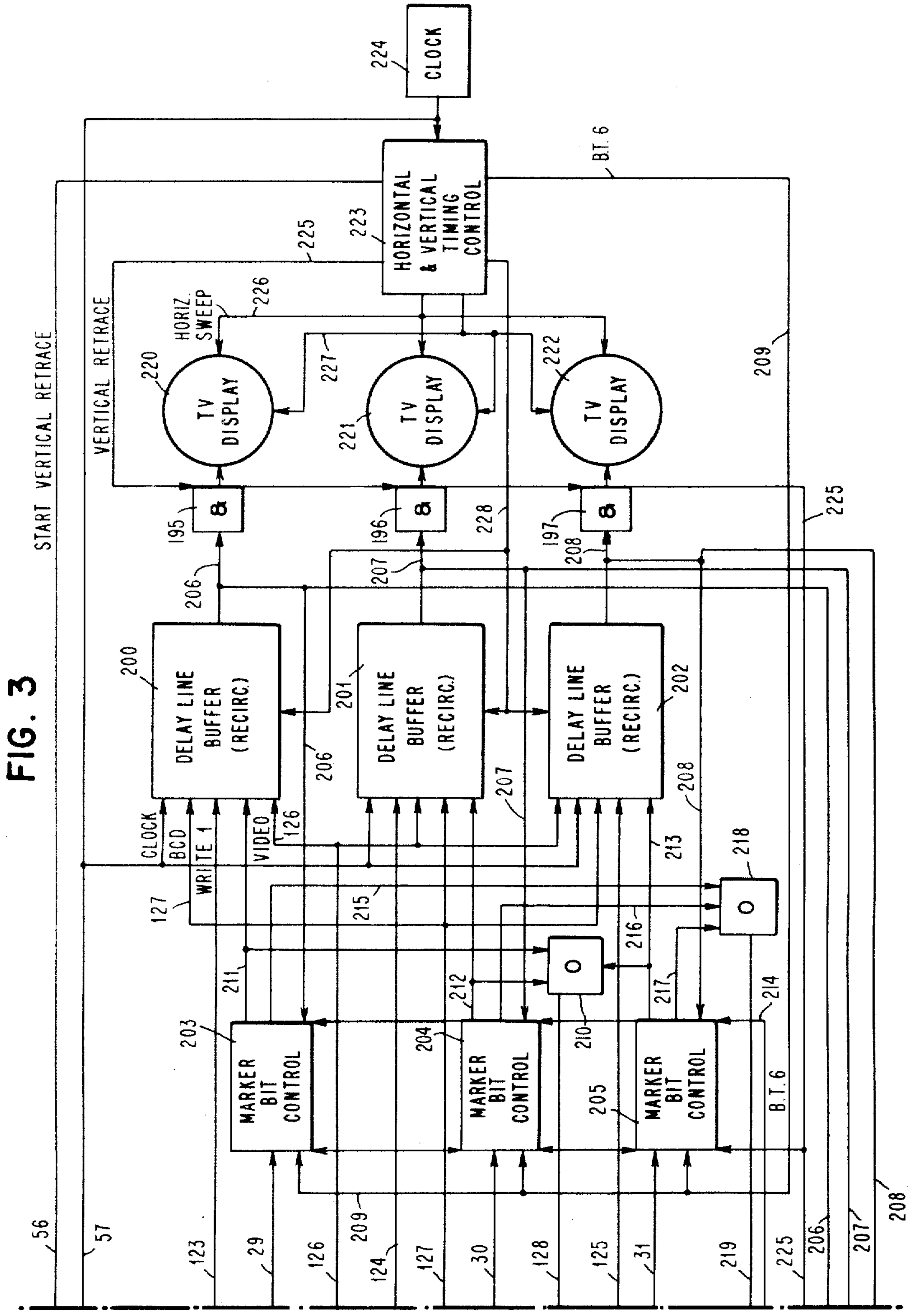
Figure 4:
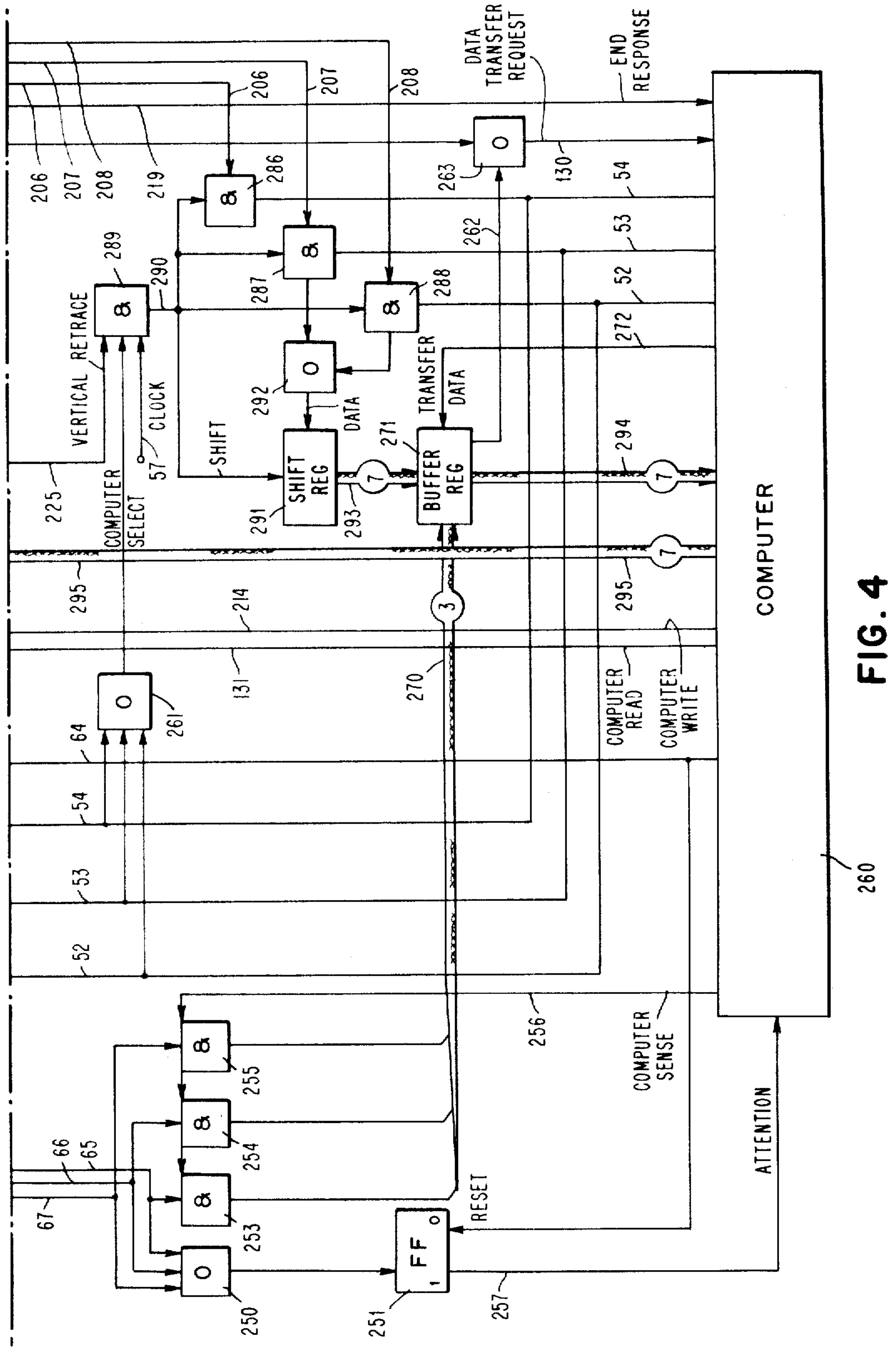

Reference is made next to FIGURES 2 through 4 which illustrate in greater detail a system arrangement of the type illustrated in block schematic form in FIGURE 1. FIGURES 2 through 4 should be arranged as illustrated in FIGURE 5. The general block diagram arrangement of a preferred embodiment of the invention illustrated in FIGURES 2 through 4 is described with respect to the manner in which the various circuit components or blocks are interconnected and the overall operation performed by each of these components or blocks. The description of the general arrangement is followed by separate and detailed descriptions of the various components or blocks where it is so required. Cables employed to transfer data are shown as two parallel lines with arrowheads at one end to signify a connection. At some point intermediate the ends of the cables the two parallel lines are widened in a somewhat semi-circular shape, and the number therein represents the number of conductors or lines in the cables. Bold face character symbols appearing within a block identify the common name for the circuit represented e.g. A for an And circuit. In some cases a plurality of And circuits or Or circuits are represented by a single block, and where such is the case, the number of such And or Or circuits is signified by a number in the lower right hand corner of the block. It is arbitrarily assumed throughout the description that positive logic is employed unless indicated otherwise. That is, the logic circuits such as And and Or circuits, for example, are operated by positive signal levels at the inputs to provide a positive signal level at the output. FIGURES 2 and 3 illustrate a logical layout of the data flow paths and the control functions of the equipment illustrated in a physical layout in FIGURE 1.

Referring first to FIGURE 2, keyboards 20 through 22 supply binary coded decimal (BCD) signals on respective cables 23 through 25 to associated And circuits 26 through 28. Each of these And circuits is a schematic representation that seven And circuits are employed, and this is signified by the numeral 7 in the lower right hand corner. Each of the seven And circuits has two inputs. The And circuit 26, for example, has seven And circuits with two inputs each. One of the inputs comes from one of the seven conductors in the Cable 23 and the other input to each And circuit is taken from the line 29. The And circuit 27 likewise includes seven individual And circuits as signified by the numeral 7 in the lower right hand corner. The seven conductors in the cable 24 are connected to indivdual ones of the And circuits, and the line 30 is connected to all of these And circuits. In like fashion, the And circuit 28 includes seven individual And circuits as signified by the numeral 7 in the lower right hand corner. The line 31 is connected to all of these And circuits, and the seven conductors of the cable 25 are connected to individual ones of these And circuits. The lines 29 through 31 are sequentially energized by a polling circuit 32. The polling circuit 32 may be any conventional circuit arrangement which is employed to sample a plurality of devices and provide each an opportunity in turn to transmit data signals. This polling circuit may be started or stopped by energizing respecive lines 33 or 34. The polling circuit 32 serves to select one of the And circuits 26 through 28 and pass binary coded signals having the format 1, 2, 4, 8, A, B, C on the associated seven conductors of respective cables 35, 36, and 37 to an Or circuit 38. The Or circuit 38 schematically represents an arrangement of seven individual Or circuits as signified by the numeral 7 in the lower right hand corner. Each of the seven Or circuits has three inputs, one from each of the three cables 35 through 37. For example, one of the Or circuits passes all of the binary 1 pulses in the lines 35 through 37; another Or circuit passes all of the binary 2 pulses from the lines 35 through 37; and another Or circuit passes all of the binary 4 pulses in the cables 35 through 37. In like fashion the binary 8, A, B and C bit signals of these cables are passed by associated Or circuits. The signals from the Or circuit 38 are conveyed on a cable 39 to Or circuits 40 and 41. The Or circuit 40 includes seven individual Or circuits as signified by the numeral 7 in the lower right hand corner, and each individual Or circuit receives two inputs. One of the inputs is taken from one of the conductors in the cable 39, and the other input is taken from a corresponding one of the conductors in a cable 42. The outputs from the Or circuit 40 are supplied through a cable 43 to a composer 100. The cable 39 is connected to the Or circuit 41 which is a single Or circuit having seven inputs, one from each of the seven conductors of the cable 39. The output of the Or circuit 41 is conveyed on a line 44 to an Or circuit 45 and an And circuit 46. The outputs of the And circuits 46 and another And circuit 47 are coupled through an Or circuit 48 to a line 33 which controls the starting of the polling circuit 32. The Or circuit 45 receives signals from And circuits 49 through 51. These And circuits are controlled by signals on the lines 29 through 31 from the polling circuit 32 and by signals on lines 52 through 54 from the computer in FIGURE 4. When any one of the And circuits 49 through 51 is conditioned, a signal passes through the Or circuit 45 and along the conductor 34 to stop the polling circuit 32. The polling circuit 32 is started by a signal on the line 33 from the Or circuit 48 whenever either one of the And circuits 46 or 47 is conditioned. These And circuits are conditioned by a signal on the line 44 and a signal on a line 58 from an Or circuit 59. The Or circuit 59 receives signals on lines 70 through 72 from the respective And circuits 73 through 75. Each of these And circuits receives a start vertical retrace signal on a line 56, a clock signal on a line 57 and a select signal from the polling circuit 32 on a corresponding one of the lines 29 through 31. Output signals from the And circuits 73 through 75 are supplied on respective lines 70 through 72 to unlock associated keyboards 20 through 22. Each keyboard is automatically locked when a key is depressed, and it remains locked until unlocked by a signal on associated one of the lines 70 through 72. This prevents an operator from typing additional characters until the last typed character has been accepted and stored in the delay line buffer of the originating terminal. The unlock signals on the lines 70 through 72 pass through the Or circuit 59 to the And circuits 46 and 47. The time required to unlock a keyboard is sufficiently long that a positive signal from the And circuit 41 persists on the line 44 to the And circuit 46 at the same time the unlock signal from the Or circuit 59 persists on the line 58 to the And circuit 46. Accordingly, the And circuit 46 is conditioned to pass a positive signal through the Or circuit 48 and along the line 33 to start the polling circuit 32. Thus the polling circuit is always started before an originating keyboard is unlocked, and this is insured by the operation of the And circuit 46. Since the polling circuit is started before a keyboard is unlocked, it prevents an operator from typing more than one character at a time from a given keyboard whenever other operators have depressed keys at their keyboards. The And circuit 47 is conditioned by an unlock signal on the line 58 and a computer end signal on a line 64. This insures that when a particular terminal has been selected by the computer and the polling circuit stopped, the polling circuit will be started by a signal from the And circuit 47 when the computer has finished is transmission to the buffer storage of the receiving terminal.

Signals from the Or circuit 38 in FIGURE 2 are supplied on the cable 39 to a parallel-serial converter 104. A video and BCD bit counter 105 supplies timing and control signals to the parallel-serial converter 104. These timing and control signals are also supplied to the composer 100, but the connections therefor are omitted in FIGURE 2 in the interest of simplicity. The video and BCD bit counter 105 receives clock signals on the line 57 and control signals to initiate its operation from the terminals on a line 128 and from the computer on a line 131.

And circuits 120 through 122 are supplied with signals on respective lines 29 through 31 from the polling circuit 32, and these And circuits receive a signal on a line 106 from the bit counter 105. The outputs of the And circuits 120 through 122 are supplied on respective lines 123 through 125 to corresponding delay line buffers 200 through 202 in FIGURE 3. The lines 123 through 125 are energized with a positive signal to indicate the appropriate time for writing in the delay line buffers. When video information is being written in the delay line buffers, signals in serial form are supplied from the composer 100 along a line 126 to the delay line buffers. When BCD information is being written in the delay line buffers, BCD signals in serial form are supplied from the parallel-serial converter 104 on a line 127 to the delay line buffers. When new information is written, the starting point for such a writing operation is indicated by a signal representing a marker bit on a line 128 to the bit counter 105. The signal on the line 128 is derived from an Or circuit 210 in FIGURE 2. An Or circuit 129 receives signals from the And circuits 120 through 122 and supplies an output signal on a line 130 to request another data transfer from the computer in FIGURE 4. This request is honored whenever the computer is transmitting data to a terminal for storage in the delay line buffer.

Reference is made next to FIGURE 3 which shows market bit control circuits 203 through 205. These marker bit control circuits receive signals on respective lines 29 through 31 from the polling circuit 32 in FIGURE 2, and each marker bit control circuit receives signals from lines 209 and 225. A positive signal is applied to the line 225 whenever the TV displays are unblanked, and a negative signal is applied to the line 225 during vertical retrace. A positive pulse is applied to the line 209 at each bit time 6. Each of the market bit control circuits 203 through 205 receives output signals from associated delay line buffers 200 through 202 on corresponding lines 206 through 208. Each marker bit control circuit receives a control signal on a line 214 from the computer 260 in FIGURE 4. As explained more fully hereinafter, marker bits are employed in the delay line buffers to indicate where data was last stored. In a writing operation the marker bit control circuits locate and destroy marker bits. New information is written in a delay line buffer right after the destroyed marker bit. When new information has been stored, a new marker bit is automatically inserted thereafter. The output lines 211 through 213 of the marker bit control circuits 203 through 205 are connected to an Or circuit 210. The output of the Or circuit 210 in turn is supplied on the line 128 to the bit counter 105 in FIGURE 2. A positive signal on the line 128 signifies that a marker bit has been located, and it serves to initiate operation of the bit counter 105 to perform a write operation. Output lines 215 through 217 from the marker bit control circuits 203 through 205 are coupled to an Or circuit 218 the output of which is conveyed on a line 219 to the computer in FIGURE 4. A positive signal is established on the line 219 whenever a BCD marker bit is located by the delay line buffers, and it signals the computer that all BCD signals have been read from the selected delay line buffer at which time the computer terminates its reading operation and deselects the transmitting terminal.

Video signals of the delay line buffers 200 through 202 are connected by respective lines 206 through 208 through respective And circuits 195 through 197 to corresponding TV displays 220 through 222. Information stored in the delay line buffers includes video signals and BCD signals. The video signals are supplied to the TV displays 220 through 222 when the TV tube is unblanked, by a positive signal on the line 225 to the And circuits 195 through 197, and BCD signals are stored in that portion of the delay line which is applied to the TV display tubes when they are blanked by a negative signal on the line 225 to the And circuits 195 through 197. Accordingly, the BCD information does not affect the TV displays. A horizontal and vertical timing control 223 receives clock pulses from a clock 224 and generates suitable signals for the horizontal and vertical sweep circuits as well as signals for controlling horizontal and vertical retrace or blank-unblank signals. The horizontal and vertical sweep signals are applied on lines 26 and 227 to all of the TV display tubes 220 through 222 simultaneously. The TV rasters are thus synchronized with each other. They are also synchronized because the entire system is manipulated by clock pulses from a common source, thereby insuring synchronism of all the system components with each other. Retrace or blank-unblank signals are applied to the And circuits 195 through 197 on a line 225 from the horizontal and vertical timing control 223. A pulse signal is supplied by the horizontal and vertical timing control 223 on the line 56 each time vertical retrace is started. Initial marker pulses are supplied by the horizontal and vertical timing control 223 on a line 228 to the delay line buffers 200 through 202 for reasons explained more fully hereinafter.

Reference is made next to FIGURE 4 which illustrates the computer or data processor and its relation to the terminals. Each keyboard 20 through 22 in FIGURE 2 is connected by an associated one of the lines 65 through 67 to an Or circuit 250 in FIGURE 4. The Or circuit 250 is connected to the one input side of a flip flop 251, and when the flip flop is set, a positive signal is established on a line 257 which signals attention to the computer 260. This signifies that a keyboard has data for transmission to the computer, and such a request is made at the keyboard by depressing a Release key. The Release key is depressed after an operator has typed a message which is stored in the delay line buffer, presented on the TV display and verified to be correct.

Signals on the lines 65 through 67 from the keyboards 20 through 22 in FIGURE 2 are applied to And circuits 253 through 255 in FIGURE 4, and these And circuits are sensed by a signal on a line 256 from the computer 260. The outputs of the And circuits 253 through 255 are supplied through a cable 270 to a buffer register 271 where they are stored. The outputs of the And circuits 253 through 255 represent the identity of a terminal originating a request to send data to the computer. The identity signals stored in the buffer register 271 are transferred to the computer 260 in response to a signal on the line 272 from the computer.

After a terminal makes a request to transfer data to the computer, the computer selects the originating terminal by energizing one of the lines 52 through 54 with a positive signal. This causes the associated one of the And circuits 49 through 51 in FIGURE 2 to be conditioned when the polling circuit 32 reaches the originating terminal. The output from one of the And circuits 49 throguh 51 causes the polling circuit to stop on the originating terminal. This selects one of the delay lines 200 through 202 in FIGURE 3 for a data transfer operation to the computer 260 in FIGURE 4. Data from a selected one of the delay line buffers 200 through 202 in FIGURE 3 is supplied on corresponding lines 206 through 208 to respective And circuits 286 through 288 in FIGURE 4. The data signals supplied to the And circuits 286 through 288 include video and BCD information. The computer uses BCD information only, and it is necessary to prevent the transmission of video signals to the computer. This is done by an And circuit 289 which is connected by a line 290 to the And circuits 286 through 288 and a shift register 291. The And circuit 289 receives a signal from an Or circuit 261 which in turn receives signals on lines 52 through 54, one of which is positively energized when a terminal is selected for data transfers to the computer 260. The And circuit 289 also receives a positive signal on the line 225 during vertical retrace and it receives positive clock pulses on the line 57. The signal on the line 225 is positive during vertical retrace, and this represents the time position in the delay line where BCD information is stored. The clock pulses on the line 57 precisely define the location of the data pulses. Accordingly, the output of the And circuit 289 conditions the And circuits 286 through 288 to pass only BCD information through an Or circuit 292 to the shift register 291. The pulses from the And circuit 289 are employed to shift the shift register 291 as data signals are received from the Or circuit 292. BCD information in the shift register 291 is transferred in seven bit bytes along a cable 293 to the buffer register 271. When the buffer register 271 is full, a line 262 is energized with a positive signal which is passed by an Or circuit 263 to the computer 260 to initiate a data transfer request. Information in the buffer register 271 is transferred to the computer along the conductors of a cable 294 in response to a signal on the line 272 from the computer, thereby honoring the data transfer request. Successive 7-bit bytes continue to be transferred from the selected one of the delay line buffers 200 through 202 in FIGURE 3 to the computer 260 in FIGURE 4 commencing with the start of vertical retrace and continuing until a BCD marker bit is located, at which time the transfer of BCD bytes is terminated by a signal on the line 219 to the computer. A signal is established on this line by one of the marker bit control circuits 203 through 205 in FIGURE 3 sending a signal on a respective one of the lines 215 through 217 to the Or circuit 218 and along the conductor 219 to the computer 260 in FIGURE 4.

When the computer 260 in FIGURE 4 has data to transmit to a given terminal, one of the lines 52 through 54 is energized to select the terminal, and this causes the polling circuit to stop on the selected terminal. The computer then transmits BCD data having the form at 1, 2, 4, 8, A, B, C on the seven conductors on a cable 295 in FIGURE 4 to a buffer register 102 in FIGURE 2. The data signals from the buffer 102 in FIGURE 2 are transmitted to the composer 100. The computer 260 in FIGURE 4 establishes a positive signal on the line 131 to the video and BCD bit counter 105 which initiates its cycle of operation. The output of the composer 100 is a serial train of video signals which are stored in the delay line buffer of the selected terminal. A signal from one of the And circuits 120 through 122 is supplied on a respective one of the conductors 123 through 125 to the Or circuit 129, and its output is supplied on the conductor 130 in FIGURE 2 and through the Or circuit 263 to the computer 260 in FIGURE 4 to initiate another data transfer request. The computer responds to this signal and supplies another 7-bit byte of BCD signals along the conductors of the cable 295 to the buffer register 102 in FIGURE 2. The computer continues to store 7-bit bytes of BCD signals in the delay line buffer of the selected terminal until all bytes of the computer message have been transmitted, at which time the computer deselects the given terminal by de-energizing the selected one of the lines 52 through 54 in FIGURE 4. This causes the associated one of the And circuits 49 through 51 in FIGURE 2 to be deconditioned, thereby removing the stop signal on the line 34 to the polling circuit 32 in FIGURE 2. The computer also sends a computer end signal on the line 64 in FIGURE 4 to the And circuit 47 in FIGURE 2, and that one of the And circuits 73 through 75 which is energized with a positive signal level by the polling circuit 32 in FIGURE 2 sends an unlock signal on a respective one of the lines 70 through 72 to the Or circuit 59 the output of which is applied on the line 58 to the And circuit 47. The And circuit 47 is thus conditioned to pass a signal through the Or circuit 48 and along the line 33 to start the polling circuit 32. It is pointed out that the keyboard of the selected station is not locked for a computer transfer. However, the unlock signal is generated for the selected terminal by the associated one of the And circuits 73 through 75 because the computer stopped the polling circuit on the selected station, and that one of the And circuits 53 through 55 associated with the selected station receives a conditioning level from the polling circuit 32. As soon as a start vertical retrace pulse is received on the line 56 and a clock pulse is reecived on line 57, which occurs once during each delay line cycle, the associated one of the And circuits 73 through 75 is conditioned to pass an unlocked signal to the And circuit 47 in FIGURE 2. The unlock signals do not pass through the And circuit 47 as long as the computer continues to send a select signal to one of the And circuits 49 through 51. The unlock signal is not needed by the keyboard, but it is needed by the And circuit 47 to initiate operation of the polling circuit 32 in FIGURE 2 after the computer 260 in FIGURE 4 completes its transmission.

Figure 6:
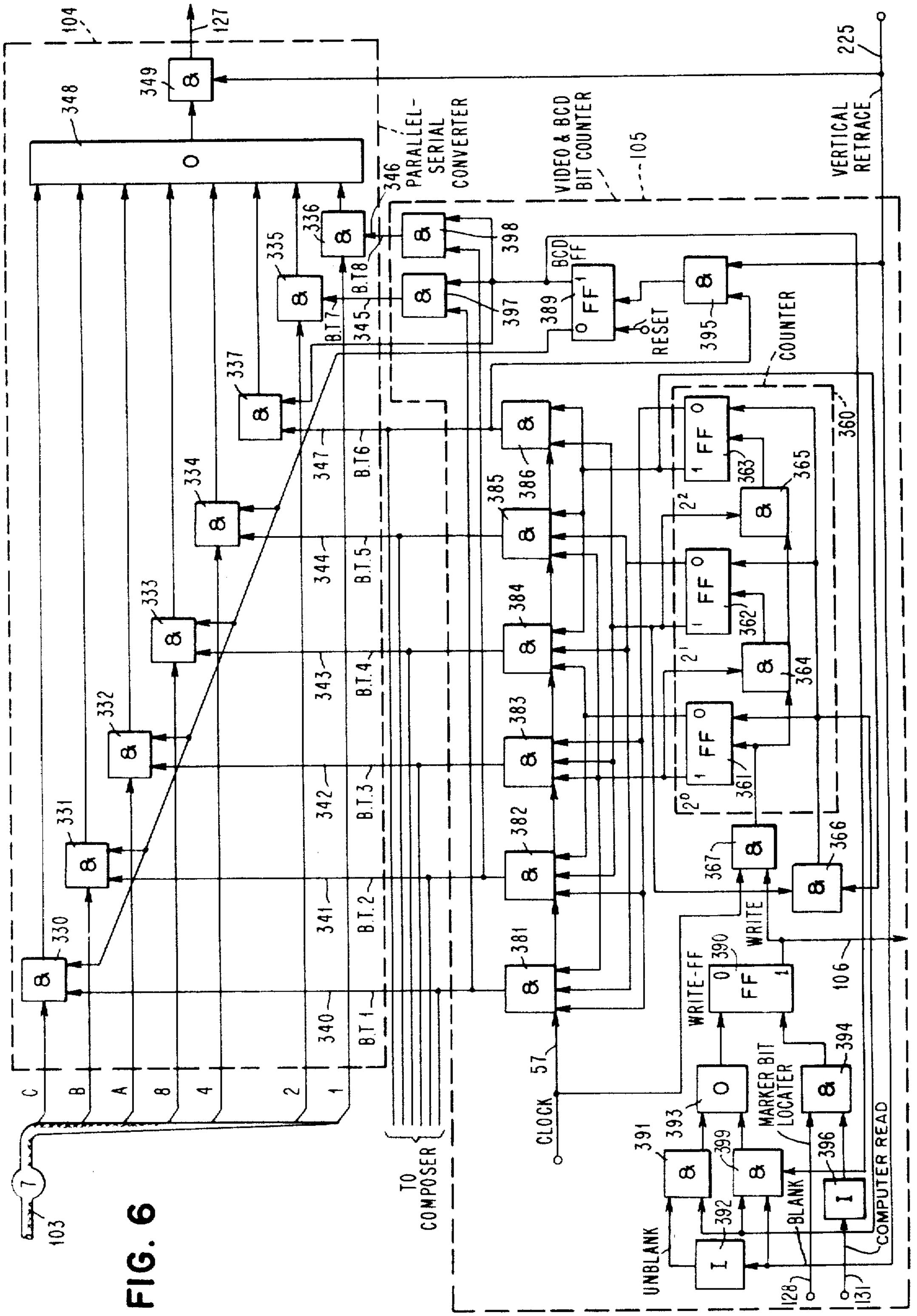
FIGURE 6 illustrates in detail the parallel-serial converter and the video and BCD bit counter shown in block form in FIGURE 2.

Reference is made next to FIGURE 6 which illustrates in detail the parallel-serial converter 104 and the bit counter 105 in FIGURE 2. The parallel serial converter 104 includes And circuits 330 through 336. Each of the And circuits receives signals from one of the conductors of the cable 103. Also, the And circuits 330 through 336 receive timing signals from respective lines 340 through 346 which are sequentially energized. The information signals supplied to the And circuits 330 through 336 are gated in sequence through an Or circuit 348 and an And circuit 349 to the output line 127 in FIGURE 6 where they appear as a series of BCD pulses. Signals on the output line 127 in FIGURE 6 are supplied to the delay line buffers 200 through 202 in FIGURE 3 when a writing operation takes place. An And circuit 337 receives timing signals on a line 347 and a control signal from a BCD flip-flop in the bit counter 105, and the And circuit 337 supplies a marker pulse output signal for BCD writing operations as hereinafter explained.

The bit counter 105 in FIGURE 6 includes a counter 360 which has flip-flops 361 through 363 and And circuits 364 and 365 connected as shown to form a counting circuit. The flip-flops 361 through 363 are reset by a positive pulse from an And circuit 366. When the counter 360 is reset, the flip-flops 361, 362 and 363 are reset to the zero state. Positive pulses from an And circuit 367 cause the counter to advance from a count of one through successive counts to a count of six when, by a special control arrangement, it is reset. The second input to each of the flip-flops 361 through 363 is a complement input, and each time the complement input to a flip-flop is energized with a positive pulse, the flip-flop reverses its state.

And circuits 381 through 386 are connected to selected combinations of the outputs of the flip-flops 361 through 363. As the counter 360 advances from a count of one to a count of six, the And circuits 381 through 386 are sequentially conditioned to pass a clock pulse on the line 57. The condition of the counter 360 which energizes each of the And circuits 381 through 386 is illustrated in Table A below.

TABLE A

| Counter 360 Content | | | And Circuit Conditioned |
|---|---|---|---|
| $2^2$ | $2^1$ | $2^0$ | |
| 0 | 0 | 1 | 381 |
| 0 | 1 | 0 | 382 |
| 0 | 1 | 1 | 383 |
| 1 | 0 | 0 | 384 |
| 1 | 0 | 1 | 385 |
| 1 | 1 | 0 | 386 |

Figure 7:
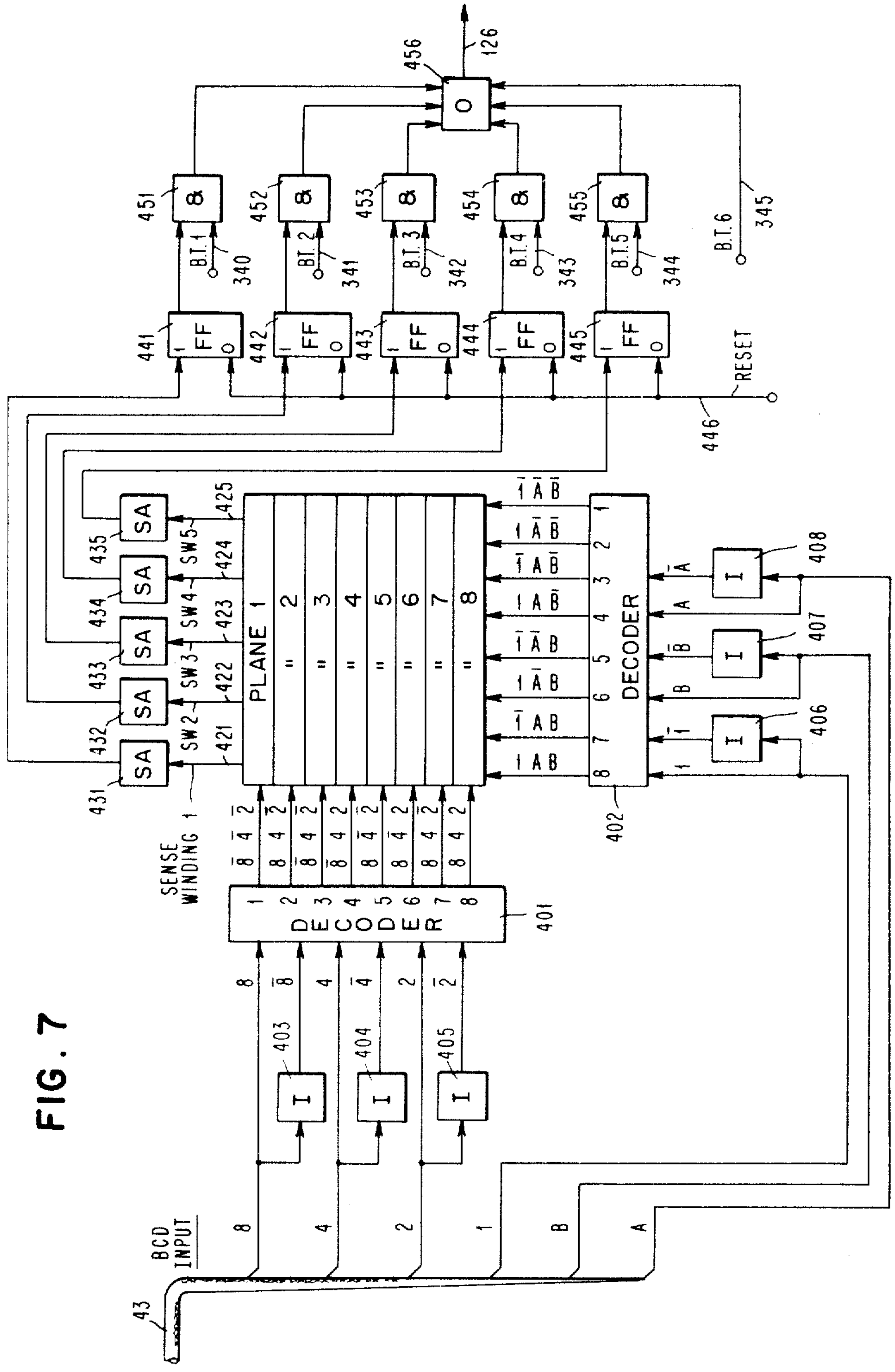
FIGURES 7 and 8 illustrate in detail the composer shown in block form in FIGURE 2.

When positive pulses are supplied on the output lines 340 through 344 and 347 from respective And circuits 381 through 386, these pulses are supplied to the composer 100 in FIGURE 2, and they are supplied to the parallel-serial converter, and when used by the parallel-to operate the composer, these pulses are not used by the parallel-serial converter, and when used by the parallel-serial converter, they are not used by the composer. BCD signals are stored in the delay line buffers at the time when the TV displays are blank and vertical retrace is taking place. At this time a positive signal level is supplied on the line 225 in FIGURE 6, and this conditions the And circuit 349 to pass the gated signals from the And circuits 330 through 337 through the Or circuit 348, the And circuit 349 and along the line 127 to the delay line buffers whenever a BCD writing operation takes place. The timed pulses from the bit counter are supplied to the composer 100 simultaneously as they are supplied to the parallel-serial converter during a BCD write operation. However, the composer is not operated whenever a BCD write operation takes place, and the flip-flops 441 through 445 in FIGURE 7 are reset to the zero state, and the timed pulses on the lines 340 through 344 in FIGURE 6 are not passed by the And circuits 451 through 455 in FIGURE 7. Consequently, a negative signal level persists on the output line 126 in FIGURE 7, and this signal level is uneventful at the delay line buffers in FIGURE 3 because the parallel-serial converter 104 in FIGURE 6 may gate serial BCD pulses to the delay line buffers. Any binary ones represented by positive signal pulses in the serial BCD train override the negative signal level from the composer 100. Thus it is seen that the bit time pulses applied to the composer do not interfere with a writing operation by the parallel-serial converter. When the composer 100 is performing a write operation, the And circuit 349 in FIGURE 6 is deconditioned, and the negative signal level on the line 127 from the And circuit 349 to the delay line buffers does not interfere with a writing operation by the composer. Any positive pulses representing binary ones from the composer override the negative signal level representing a zero from the parallel-serial converter. Thus it is seen that the composer and the parallel-serial converter do not interfere with each other during a writing operation.

The bit counter 105 in FIGURE 6 is operated during a write operation only, and it causes BCD or video signal pulses to be supplied to the delay line buffers 200 through 202 in FIGURE 3 at the clock rate and in synchronism with the clock pulses. A writing operation is controlled by a write flip-flop 390 in FIGURE 6. The write flip-flop is set to the one state by a positive pulse representing a marker bit which is stored in the selected delay line buffer. It is detected and supplied by one of the marker bit control circuits 203 through 205 in FIGURE 3 through an Or circuit 210 and along the conductor 128 to the And circuit 394 and to the write flip-flop 390 in FIGURE 6. The flip-flop 390 is set to the one state also by a signal from an inverter 396 which is controlled by the computer 260 in FIGURE 4, when a writing operation is performed in the delay line buffer storage devices 201 through 202 by the computer.

When the write flip-flop is set to the one state for a video writing operation, clock pulses on the line 57 in FIGURE 6 are passed by the And circuit 367 to manipulate the counter 360. The counter 360 sequences through its cycle, and when a count of six in binary is reached, the And circuit 386 is conditioned to pass a clock pulse at bit time six. The TV displays are unblanked during a video writing operation, and a positive signal level is supplied from the inverter 392 to the And circuit 391. When the counter has a count of six, a positive signal is passed by the And circuit 366 to the And circuit 391 which in turn passes a positive signal through an Or circuit 393 to the zero input side of the write flip-flop 390, thereby resetting this flip-flop. The positive output signal of the And circuit 366 also resets the counter 360. This terminates the video writing operation for a given horizontal sweep. When the marker bit is detected on the succeeding horizontal sweep, the write flip-flop 390 is set to the one state, and the counter 360 is cycled once again, thereby generating bit time pulses 1 through 6. The write flip-flop 390 is manipulated on and off, thereby cycling the counter 360 to generate bit time pulses 1 through 6, seven times in seven consecutive horizontal sweeps for the purpose of writing all of the video bits of a character in a selected one of the delay line buffers 200 through 202 in FIGURE 3. As pointed out more fully in FIGURE 8, each character has seven rows of 5-bits each, and each row of cores is converted to timed pulses, a pulse being provided for each core in a given row which is threaded by the character winding. Thus it takes seven video writing operations to store the 5-bit bytes for each of the seven rows.

When a BCD writing operation is performed, the counter 360 must be cycled twice. During a BCD writing operation a positive signal representing vertical retrace is presented on the line 225 in FIGURE 6, and this signal conditions the And circuit 349 to pass BCD signals to the output line 127. As soon as the BCD marker bit is located by one of the marker bit control circuits 203 through 205 in FIGURE 3, a positive pulse is sent through the Or circuit 210 in FIGURE 3 along the line 128 to the And circuit 394. If the computer 260 in FIGURE 4 is not reading data, the And circuit 394 passes the positive signal on the line 128 to the one input side of the write flip-flop 390 in FIGURE 6, thereby setting this flip-flop. The And circuit 367 in FIGURE 6 is thus conditioned to pass clock pulses to the counter 360 and sequence it through a cycle. Bit timing pulses 1 through 6 are supplied at the clock rate to the And circuits 330 through 334 and 337 in sequence. Bit time pulses one through 5 gate associated bits C, B, A, 8, 4 from the cable 103 to the Or circuit 348 and to the And circuit 349 to the output line 127 which conveys these serial BCD pulses to the delay line buffers 200 through 202 in the FIGURE 3. The And circuit 337 receives a positive pulse at bit time 6, but this pulse is not passed by the And circuit 337 because the BCD flip-flop 389 which is reset at the beginning of a writing operation continues in its reset state, supplying a negative signal level from the one output side to the And circuits 337, 397, 398 and 399. The negative level from the And circuit 399 is applied through the Or circuit 393 to the zero input side of the write flip-flop 390. This negative signal level to the zero input side of the flip-flop 390 is ineffective to reset the flip-flop, and it continues in the one state. The positive pulse at the end of bit time 6 is applied to an And circuit 395 which is conditioned by a positive signal level on the line 225. Thus the positive pulse at the end of bit time 6 is applied to the one input side of the BCD flip-flop 389, thereby setting this flip-flop to the one state. At the same time the counter is reset because the And circuit 366 provides a positive output signal. The positive level from the one output side of the flip-flop 389 conditions And circuits 337, 397 and 398. The negative level from the zero output side of the flip-flop 389 deconditions the And circuits 330 through 334 in the parallel-serial converter. The bit time pulses 1 through 6 are generated again on the lines 340 through 347. The positive pulse at bit time 1 is passed by the And circuit 397 to the And circuit 335, and this gates the BCD quantity 2 from the cable 103 through the Or circuit 348 and the And circuit 349 to the output line 127. The positive pulse at bit time 2 is passed by the And circuit 398 to the And circuit 336, and this gates the BCD quantity 1 from the cable 103 through the Or circuit 348 and the And circuit 349 to the output line 127. Bit time pulses 3, 4 and 5 gate no data signals through the Or circuit 348 and the And circuit 349 to the output line 127. Thus the output signal level on the line 127 is a negative signal level for the duration of bit times 3 through 5. The And circuit 337 is conditioned by the positive level from the one output side of the BCD flip-flop 389, and it passes the positive pulse at bit time 6 through the Or circuit 348 and the And circuit 349 to the output line 127. This positive pulse at bit time 6 represents a marker pulse which is stored in the selected delay line. The marker pulse signifies the end of this writing operation and the location where the next two 5-bit bytes of BCD information are to be stored in the next writing operation. When the counter again tries to step to seven, it provides a positive signal from the output of the And circuit 366 at the end of 6 time through the And circuit 396 to the complement input of the flip-flop 389, thereby reversing its state and resetting this flip-flop. The positive signal from the And circuit 366 is applied also to an And circuit 399, and this And circuit is conditioned with a positive signal level on the line 225 to pass the positive pulse through the Or circuit 393 to the zero input side of the write flip-flop 390, thereby resetting this flip-flop and terminating the BCD writing operation. Thus it is seen that a BCD write operation is performed by cycling the counter 360 twice and supplying two 5-bit bytes of serial BCD information, the last bit of which is a marker bit, to the delay line buffers 200 through 202 in FIGURE 3.

Figure 8:
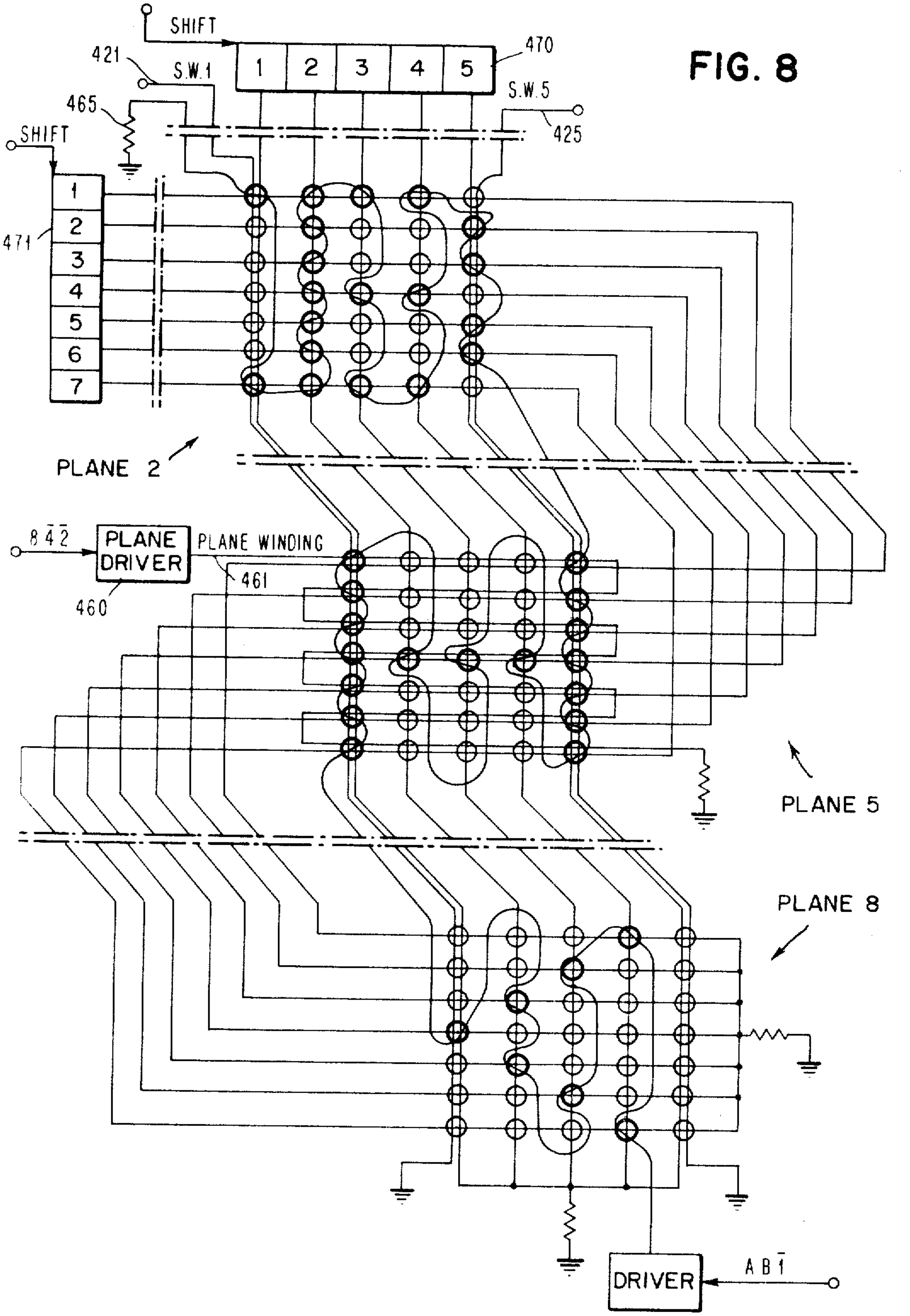

Reference is made next to FIGURES 7 and 8 which illustrate in detail the composer 100 in FIGURE 2. Referring first to FIGURE 7, BCD signals from the input cable 43 in FIGURE 2 are supplied to decoders 401 and 402 in FIGURE 7. Both the true and complement values of the input quantities are applied to the decoders 401 and 402. For this purpose the inverters 403 through 405 are employed in connection with the decoder 401, and inverters 406 through 408 are employed in connection with the decoder 402. The quantities A, B and 1 are applied to the decoder 402, and they select given character windings disposed in each of the planes 1 through 8. The quantities 2, 4 and 8 are supplied to the decoder 401, and they select a plane winding in a given one of the planes 1 through 8. As explained more fully hereinafter, the selected plane provides video signals on sense windings 421 through 425 to sense amplifiers 431 through 435. The sense amplifiers in turn supply these signals to the one input side of respective flip-flops 441 through 445. The signals from the sense amplifiers are supplied in parallel to the flip-flops 441 through 445. The outputs from these flip-flops to respective And circuits 451 through 455 are sampled in serial fashion by positive pulses applied sequentially to the lines 340 through 345. The positive pulse applied to the line 345 is a marker pulse. A serial train of video digital signals are supplied through an Or circuit 456 to the line 126. Serial pulses on the line 126 are video signals which are conveyed to the delay line buffers during a video writing operation.

Reference is made to FIGURE 8 which illustrates in detail the construction of the planes 1 through 8 in FIGURE 7. In the interest of simplicity planes 2, 5 and 8 are illustrated. Each plane includes a 5 x 7 matrix of small magnetic cores arranged as illustrated. Each plane has a plane driver and a plane winding such as the plane driver 460 and the plane winding 461 illustrated in plane 5. The plane drivers and plane windings for planes 2 and 8 in FIGURE 8 are omitted to avoid unduly complicating the drawing. Each plane includes a plurality of character windings, but only one character winding per plane is illustrated in planes 2, 5 and 8 in FIGURE 8 in the interest of simplicity. The character winding in plane 8 threads cores which represent the mathematical symbol "greater than;" the character winding in plane 5 threads cores which represent the letter H; and the character winding in plane 2 threads cores which represent the letter B. The character winding shown in FIGURE 8 are interconnected, and they are selected by the decoder 402 in FIGURE 7 when the signals A, B, $\bar{1}$ are applied thereto. The decoder 402 in FIGURE 7 then supplies a positive signal level to the driver 464 in FIGURE 8. The output of the driver 464 is a half current which is supplied through the character windings shown in planes 2, 5 and 8 to a resistor 465. A half current is not sufficient, by itself, to change the magnetic state of the cores threaded by the selected character windings. The selected plane driver, such as the plane driver 460 in Plane 5, provides a half current to all cores in the selected plane. The magnetomotive force produced by the current on the plane winding and the magnetomotive force produced by the character windings are in an aiding relationship. The net result is a magnetomotive force sufficient to change the magnetic state of the cores in the selected plane which are threaded by the selected character winding. Thus the cores representing the selected characters are set in the chosen plane. The remaining cores, the unselected cores, in the chosen plane remain reset. It is pointed out that all cores in all planes are reset prior to operation.

Each plane of magnetic cores is provided with horizontal and vertical drive lines. The horizontal drive lines pass through all planes as illustrated, and the vertical drive lines pass through all planes in like fashion. A five stage shift register 470 is employed to supply read currents to the vertical drive lines, and a seven stage shift register 471 is employed to provide read currents to the horizontal drive lines. Currents on the horizontal drive lines are half currents, and currents on the vertical drive lines are half currents. The read currents on the horizontal and vertical drive lines aid each other, and resultant magnetomotive force is in a direction to reset the cores interrogated. The magetomotive force produced by the read currents is polled opposite to that of the magnetomotive force produced by the write currents in the selected plane winding and the selected character winding.

In order to perform a read operation the shift register 471 is energized so that stage 1 provides a half current in its output, and stages 2 through 7 provide no output current. While stage 1 of shift register 471 provides a half-current output, the shift register 470 is cycled from stages 1 through 5 sequentially so that each stage in turn provides a half current in its output. This causes the top row of cores in each plane to receive a magnetomotive force sufficient to reset all of these cores, if any were previously set. If any core undergoes a reversal in its magnetic state, a signal is induced on the associated ones of the sense windings 421 through 425, and an output signal is supplied through the associated sense amplifiers 431 through 435 to corresponding ones of flip-flops 441 through 445 in FIGURE 7. Timing pulses from the bit counter 105 in FIGURE 6 are sequentially applied to the And circuits 451 through 455 in FIGURE 7, and a serial train of video digital signals are supplied through the Or circuit 456 to the line 126 in FIGURE 7. These video signals are supplied to the delay line buffers 200 through 202 in FIGURE 3 where they are written in the destination terminal. Next the shift register 471 in FIGURE 8 is advanced to stage 2, and stage 2 provides a half current in its output while the remaining stages supply no output current. While the shift register 471 is maintained in this condition, the shift register 470 is advanced from stages 1 through 5 with each stage in turn providing a half current output. This causes all cores in the second row of each plane to be interrogated and supplied along the sense windings through the sense amplifiers 431 through 435 to flip-flops 441 through 445. These flip-flops are reset by signals on a line 446 before each set of video signals is read from a selected plane. The signals read from the second row of cores in the selected plane are stored in the flip-flops 441 through 445 and they are converted to a serial pulse train on the line 126 by pulses from the bit counter, as explained above. The third through seventh rows of cores in the selected plane are read in like fashion by advancing the shift register 471 sequentially through the remaining stages and advancing the shift register 470 once through all of its stages for each stage of the shift register 471. Thus it is seen that a given character in a selected plane is interrogated row by row until all seven rows have been read. The signals produced by each row are supplied to the flip-flop 441 through 445 and then converted into a serial train on the line 126 and supplied to the delay line buffers.

Table 1 below signifies the disposition of character windings in the various planes, the frame winding selected by signals applied to the decoder 401 and the character winding selected by signals applied to the decoder 402.

TABLE 1

| | A B 1 | A B $\bar{1}$ | $\bar{A}$ B 1 | $\bar{A}$ B $\bar{1}$ | A $\bar{B}$ 1 | A $\bar{B}$ $\bar{1}$ | $\bar{A}$ $\bar{B}$ 1 | $\bar{A}$ $\bar{B}$ $\bar{1}$ | Frame |
|---|---|---|---|---|---|---|---|---|---|
| $\bar{8}\,\bar{4}\,\bar{2}$ | A | & | J | — | / | S.C. | 1 | Blank | 1 |
| $\bar{8}\,\bar{4}\,2$ | C | B | L | K | T | S | 3 | 2 | 2 |
| $\bar{8}\,4\,\bar{2}$ | E | D | N | M | V | U | 5 | 4 | 3 |
| $\bar{8}\,4\,2$ | G | F | P | O | X | W | 7 | 6 | 4 |
| $8\,\bar{4}\,\bar{2}$ | I | H | R | Q | Z | Y | 9 | 8 | 5 |
| $8\,\bar{4}\,2$ | . | S.C. | S.C. | S.C. | S.C. | S.C. | S.C. | 0 | 6 |
| $8\,4\,\bar{2}$ | [ | S.C. | ] | S.C. | S.C. | S.C. | S.C. | S.C. | 7 |
| $8\,4\,2$ | ≠ | < | S.C. | S.C. | S.C. | S.C. | S.C. | S.C. | 8 |

S.C.=special character.

Let it be assumed for purposes of illustration that it is desired to convert BCD signals representing the character H to video signals for a TV display. From Table 1 above it can be readily determined that the BCD representation for the letter H is A, B, $\bar{1}$, $\bar{2}$, $\bar{4}$, 8. These signals are supplied on the conductors of the cable 43. The signals A, B, $\bar{1}$ are supplied to the decoder 402, and the output line labeled A, B, $\bar{1}$ is energized with a positive signal level. This signal level is applied to the driver 464 in FIGURE 8 which provides a half current on the associated inter-connected character windings in the various planes. The signals $\bar{2}$, $\bar{4}$, 8 are supplied to the decoder 401 in FIGURE 7 which supplies a positive signal level on the output line labeled $\bar{2}$, $\bar{4}$, 8 to the plane driver 460 in FIGURE 8 which provides a half-current on its plane winding 461. It is assumed that all magnetic cores in all planes were previously reset. Since the cores threaded by the character winding in plane 5 receive a half current from the character winding and a half current from the plane winding, they are set. That is, they undergo a change in magnetic state. All remaining cores in plane 5 receive a half current from the plane winding, but this is not adequate to change them from the reset state to the set state. The currents applied to the drivers 460 and 464 are coincident currents, and as soon as the selected cores in plane 5 have been set, these coincident currents are terminated. Next the shift registers 470 and 471 are operated, as previously explained, to read successive rows in plane 5 commencing with the first and ending with the seventh. Each row provides a five bit byte of digital video signals which are serially scanned and supplied to the delay line buffers 200 through 202 in FIGURE 3 under control of the bit counter 105 in FIGURE 2. Thus it is seen how the composer 100 is operated to convert BCD signals representing the letter H to video signals. From Table 1 it readily is determined how each of the symbols is selected, and this chart also indicates in which plane each is located.

Figure 9:
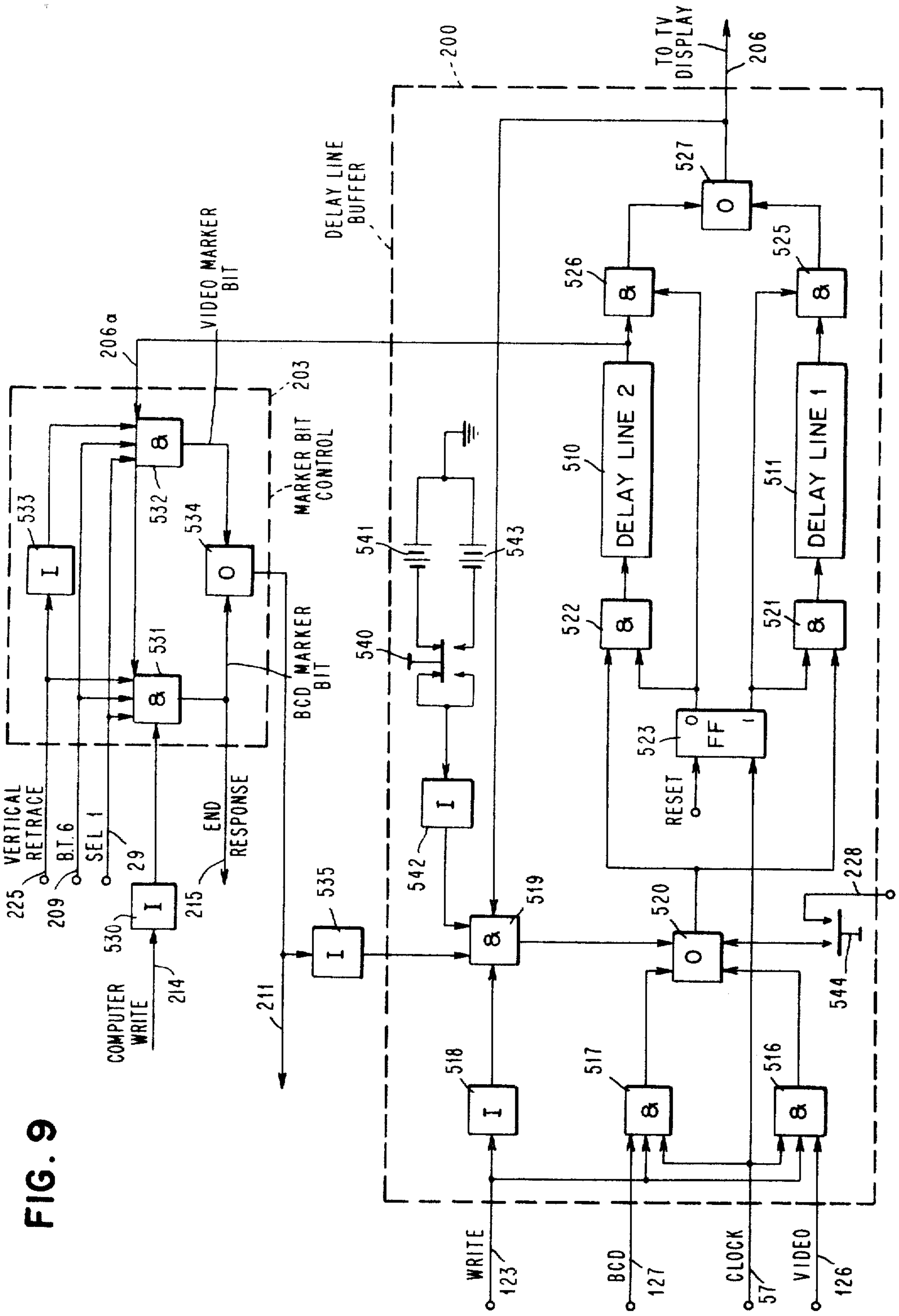
FIGURE 9 illustrates in detail one of the delay line buffers and one of the marker bit control devices shown in block form in FIGURE 3.

Reference is made to FIGURE 9 for a detailed showing of the marker bit control circuit 203 and the delay line buffer 200 in FIGURE 3. The delay line buffer 200 is described first. It has an And circuit 516, an And circuit 517 and an inverter 518 which are connected as shown to receive input signals on input lines 57, 123, 126 and 127. These logical circuits control the writing of new information in delay lines 510 and 511. An And circuit 519 controls the re-entry of output data from the delay lines to the input thereof, and it also controls the entry of marker bits, as explained subsequently.

All information entered into the delay lines passes through an Or circuit 520 to an And circuit 521 or an And circuit 522. Clock pulses supplied to the line 57 in FIGURE 9 are coupled to the complement input of a flip-flop 523. This flip-flop is reset to the zero state initially, and the clock pulses on the line 57 are applied alternately to the And circuits 521 and 522. Basically, this flip-flop acts as a frequency divider which applies odd numbered clock pulses to the And circuit 521 and even numbered clock pulses to the end circuit 522. Data signals to be written into the delay lines is supplied to both of the And circuits 521 and 522, and the data signals are commutated and stored with odd numbered bits in delay line 511 and the even numbered bits in delay line 510. The output signals from these delay lines are commutated by the And circuits 525 and 526. The outputs from these And circuits are supplied to an Or circuit 527, the output of which is conveyed on the line 206 to the TV display 220 in FIGURE 3. The line 206 also supplies the output signals to the And circuit 519 for re-insertion in the delay lines whereby the information may be retained and repetitively presented to the TV display. For a more elaborate description of the operation of the delay line buffer 200 in FIGURE 9, reference is made to co-pending application Ser. No. 487,887 now U.S. Patent 3,413,615 filed Sept. 16, 1965, entitled "Delay Line Buffer Storage Circuit" which is assigned to assignee of this invention.

Marker bits are inserted in the delay line buffer 200 at bit time six after the last BCD byte. BCD information is stored in the delay line at that point in time commencing with the start of vertical retrace and continuing until the last BCD byte is stored at which time a marker bit is inserted at bit time six of the last byte. Only one marker bit is employed in that portion of the delay line utilized for storage of BCD information. Marker bits are stored in that portion of the delay line buffer utilized to store video information for the TV displays. Initially, marker bits for the video portion are stored immediately preceding the point in time where each horizontal line sweep commences, and this point in time occurs at bit time 6. Since these video marker bits in the delay line output occur immediately before the horizontal sweep commences for each line in the TV display, they are not visible on the TV display. They are useful in controlling synchronization. If video information is written into the delay line buffer for display on any horizontal line, the present marker bit is destroyed prior to writing, and a new marker bit is inserted immediately at the end of the writing operation. All information stored in the delay line buffer is grouped into 6-bit bytes with the sixth bit in all instances being reserved for the marker bit. When the marker bit is destroyed prior to commencing the writing operation of a new byte, the sixth bit of the preceding byte is left blank, and this provides a space between adjacent characters. Whenever characters are displayed on the TV display, the marker bit appears immediately to the right of the character, and it serves as a cursor. It is specially useful when an operator has intentionally inserted several blank spaces since it permits him to see where the next character may be displayed.

The marker bit control circuit 203 in FIGURE 9 serves two functions. It destroys present markers bits, both video and BCD marker bits, prior to a writing operation, and it locates the BCD marker bit during a reading operation. The BCD marker bit in a reading operation signifies that all BCD information has been read, and reading should be terminated. The marker bit control circuit 203 in FIGURE 9 includes And circuits 531 and 532. Both And circuits receive bit time 6 pulses on the input line 209 and select 1 levels on the input line 29. Vertical retrace signal levels are applied to the input line 225 to the And circuit 531, and this input level is supplied through an inverter 533 to the And circuit 532. A signal on the line 214 is applied through an inverter 530 to the And circuit 531. The input line 225 is energized with a positive signal level during vertical retrace, and it is energized with a negative signal level when information is displayed on a TV display. Thus the And circuit 531 may be activated during vertical retrace, and the And circuit 532 may be activated at all other times. The And circuit 531 locates the BCD marker bit and the And circuit 532 locates video marker bits. The outputs of the And circuits 531 and 532 are supplied through an Or circuit 534, along the conductor 211 to the delay line buffer 200. Signals on the conductor 211 pass through an inverter 535 to the And circuit 519 in the delay line buffer 200.

Since all marker bits are stored in the delay line buffer at bit time 6, they appear in the delay line 2 which stores all even numbered bits. The output of the delay line 2 is supplied on a line **206*a* to the marker bit control circuit 203. When a marker bit appears on the line 206*a* during a writing operation, it is passed by either the And circuit 531, when writing BCD information, or the And circuit 532, when writing video information, and it is passed by the Or circuit 534 and the inverter 535 to the And circuit 519. The signal level on the line 211 to the And circuit 519 is normally a positive signal level which conditions the And circuit 519 to permit re-entry into the delay lines of all output signals. When a positive pulse representing a marker bit is detected by the marker bit control 203, this positive signal is changed at the output of the inverter 535 to a negative signal which deconditions the And circuit 519 and inhibits the re-entry of the marker bit into the delay line buffer. The marker bit is removed at bit time six. The entire period it takes a signal from the output of the delay line 510 to pass along the conductor 206*a*, through one of the And circuits 531 or 532, through the Or circuit 534 and inverter 535 to the And circuit 519 is made equal to or less than the time it takes the signal from the output of the delay line 510 to pass through the And circuit 526 and the Or circuit 527 to the And circuit 519. This timing relationship insures that all portions of the marker bit are destroyed. The space previously occupied by the marker bit is left blank, and new information is inserted in the 5 bit positions immediately thereafter. The And circuit 531 in the marker bit control 203 supplies an output signal on the line 215 to the computer 260 in FIGURE 4 which serves to terminate a read operation of BCD information as previously explained. A positive pulse on the output line 211 from the Or circuit 534 is used ultimately to set the write flip-flop 390 in the bit counter 105** in FIGURE 6.

A cancel switch 540 in FIGURE 9 normally rests in the position shown and supplies a negative level from a source 541 to an inverter 542. The inverter thus supplies a positive level from its output to the And circuit 519, thereby conditioning the And circuit to permit re-entry of signals from the delay line is schematically depicted at 600 in FIGURE 10 with a portion thereof used for storing BCD information and the remainder thereof used for storing video information. The portion of the delay line employed for storing BCD information is 714 microseconds long, and the portion used for storing video information is 4800 microseconds long. As pointed out earlier the information stored in the delay line is synchronized with the associated TV display. That portion of the delay line 600 used for storing video information is supplied to the TV display when it is unblanked, and the BCD portion is supplied to the TV display when it is blanked and performing a vertical retrace. The video portion of the delay line 600 stores video signals for each horizontal sweep. One horizontal sweep portion is designated at 601 in FIGURE 10. As illustrated more specifically in FIGURE 11 there are 64 microseconds allotted in the delay line for each horizontal line of the TV display. This 64 microsecond period includes 10 microseconds for horizontal retrace, during which time the electron beam of the TV tube is blanked, and 54 microseconds for displaying characters on the face of the TV display tube during which time the electron beam is unblanked and is modulated under control of the video information signals. Video signals are stored in 6 bit bytes in the horizontal portion of the delay line 601 in FIGURE 11. One such byte is illustrated at 602 in FIGURE 11, and this byte is illustrated in detail in FIGURE 12 as including bits 1 through 5 for storing video information signals with bit 6 being allocated for storage of a marker bit. Each 6 bit byte occupies 3 microseconds in that portion of the delay line 601 in FIGURE 11. Thus it follows that there are 18 bytes of video information available for each horizontal line, and there are 64 horizontal lines per raster where a horizontal retrace period is not allotted to the 64th line. It is unnecessary to provide 10 microseconds for outputs of the delay lines to the inputs thereof. When the cancel switch 540 is depressed, it supplies a positive signal level from a source 543 to the inverter 542 which in turn supplies a negative signal level to the And circuit 519, thereby deconditioning this And circuit. This prevents re-entry of signals from the outputs of the delay lines to the inputs thereof, and all information signals in the delay lines 510 and 511 are erased or destroyed as soon as one delay line cycle is completed. When the cancel switch 540 is released, new signals may be stored in the delay lines 510 and 511.

Marker bits are inserted initially in the delay line buffer prior to performing writing operations of video and BCD signals. One marker bit is inserted in each horizontal line of the TV display. It is inserted in the delay line buffer at a point in time which occurs one bit time before horizontal retrace ends. Also, one marker bit is inserted in the first bit position of the BCD portion of the delay line buffer. It is inserted in the delay line buffer at a point in time which is the first bit period of vertical retrace. These initial marker bits are inserted by depressing a switch 544 which is normally open as shown. This passes positive signals representing marker bits from a line 228 to the Or circuit 520. These signals are thereby stored in the delay line buffer as the clock is continuously running. Marker bit signals are supplied by the horizontal and vertical timing control 223 is FIGURE 16, as explained subsequently. The switches 540 and 544 may be located on the keyboard 20 for convenience.

Figures 10, 11, 12, 13:
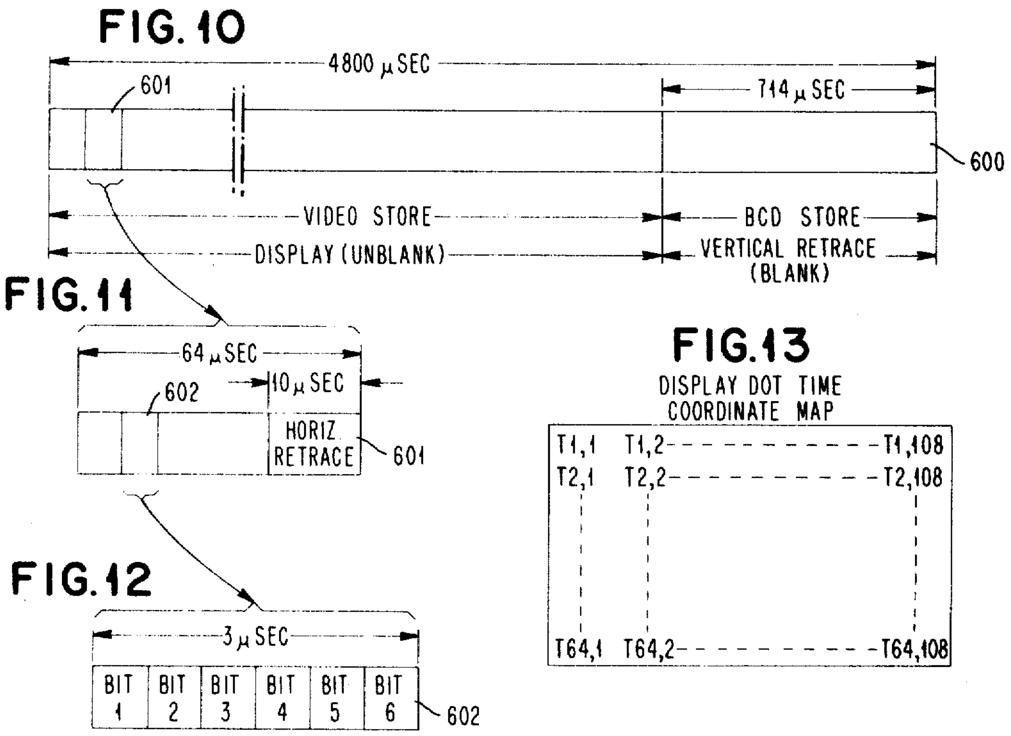
FIGURES 10 through 15 illustrate diagrams which are useful in explaning the format of information stored in the delay line buffers in FIGURE 3 and the manner in which the displays are generated on the face of the display devices in FIGURE 3.

Reference is made to FIGURES 10 through 16 for a discussion of the timing aspects of the TV displays 220 through 222 in FIGURE 3. In one arrangement constructed according to this invention, the length of the delay line buffers 200 through 202 in FIGURE 3 were made 4800 microseconds long. A retrace at the end of the last horizontal line, and vertical retrace may be started at this point. A display dot time coordinate map for the face of the TV display is illustrated in FIGURE 13. The time for displaying the first dot on the first line is designated T1, 1 and continuing to the right until the last dot time which is designated by T1, 108. There are a total of 108 dot times per line of the TV display. There are a total of 64 lines for displaying video signals as shown in FIGURE 13.

Figure 14:
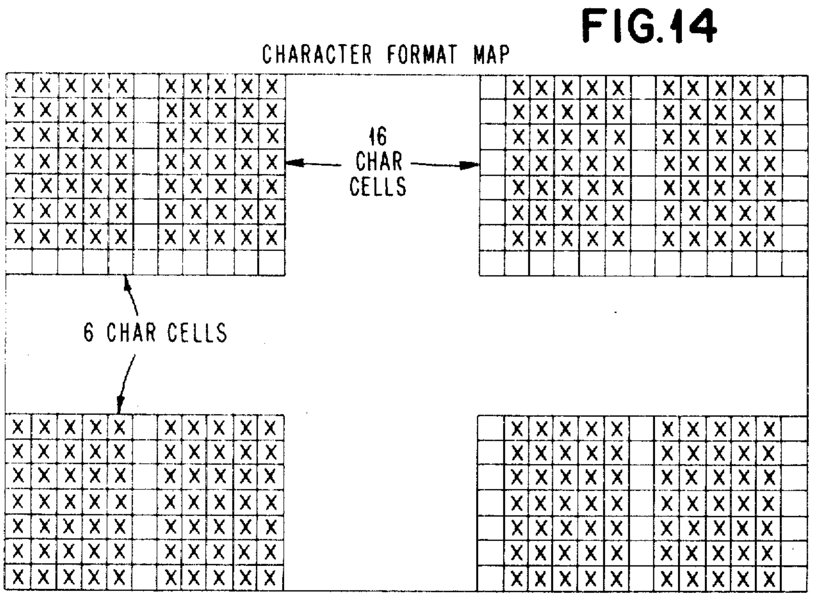

FIGURE 14 illustrates the character format for the TV display. It includes a matrix on the face of the TV display tube which is 18 character cells wide and 8 character cells high. Each character cell constitutes a matrix which is 6 bits wide and 8 bits high. Five of the six horizontal bits may be used for video display, and the sixth bit serves as a marker bit which is removed when the next character is stored, thereby providing horizontal spacing between adjacent characters. A blank horizontal line is provided for vertically spacing the characters. A total of 8 times 18 or 144 characters may be displayed on the face of the TV tube.

Figure 15:
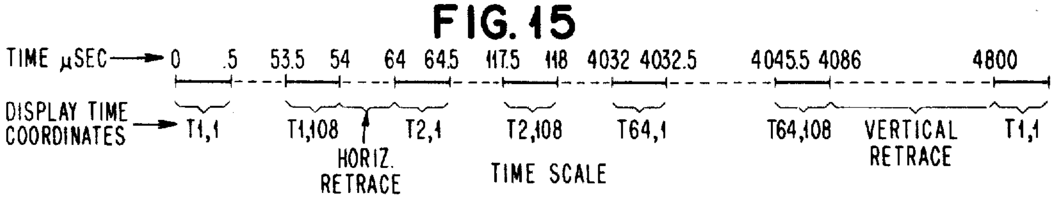

A FIGURE 15 depicts the relationship between the delay line length, the dot time coordinates of the display, the horizontal sweeps and the vertical retrace which constitute one raster. This diagram is helpful in coordinating the relationships outlined in FIGURES 10 through 14. This diagram is helpful also in correlating the relationship of the electron beam as it cycles through the character format in FIGURE 14, including horizontal and vertical retrace, with events in the delay line 600 in FIGURES 10 through 12. It is pointed out in FIGURE 15 that vertical retrace commences at the time of 4086 microseconds of the delay line cycle and continues until 4800 microseconds which is the end of the delay line cycle and the beginning of the next delay line cycle. The time duration of the vertical retrace period is eleven horizontal lines (11×64) or 704 microseconds plus 10 microseconds for a total of 714 microseconds. Vertical retrace starts at the point in time where the horizontal retrace commences in the 64th line. In other words, vertical retrace starts 10 microseconds early because horizontal retrace is eliminated in the last line of the video display.

Figure 16:
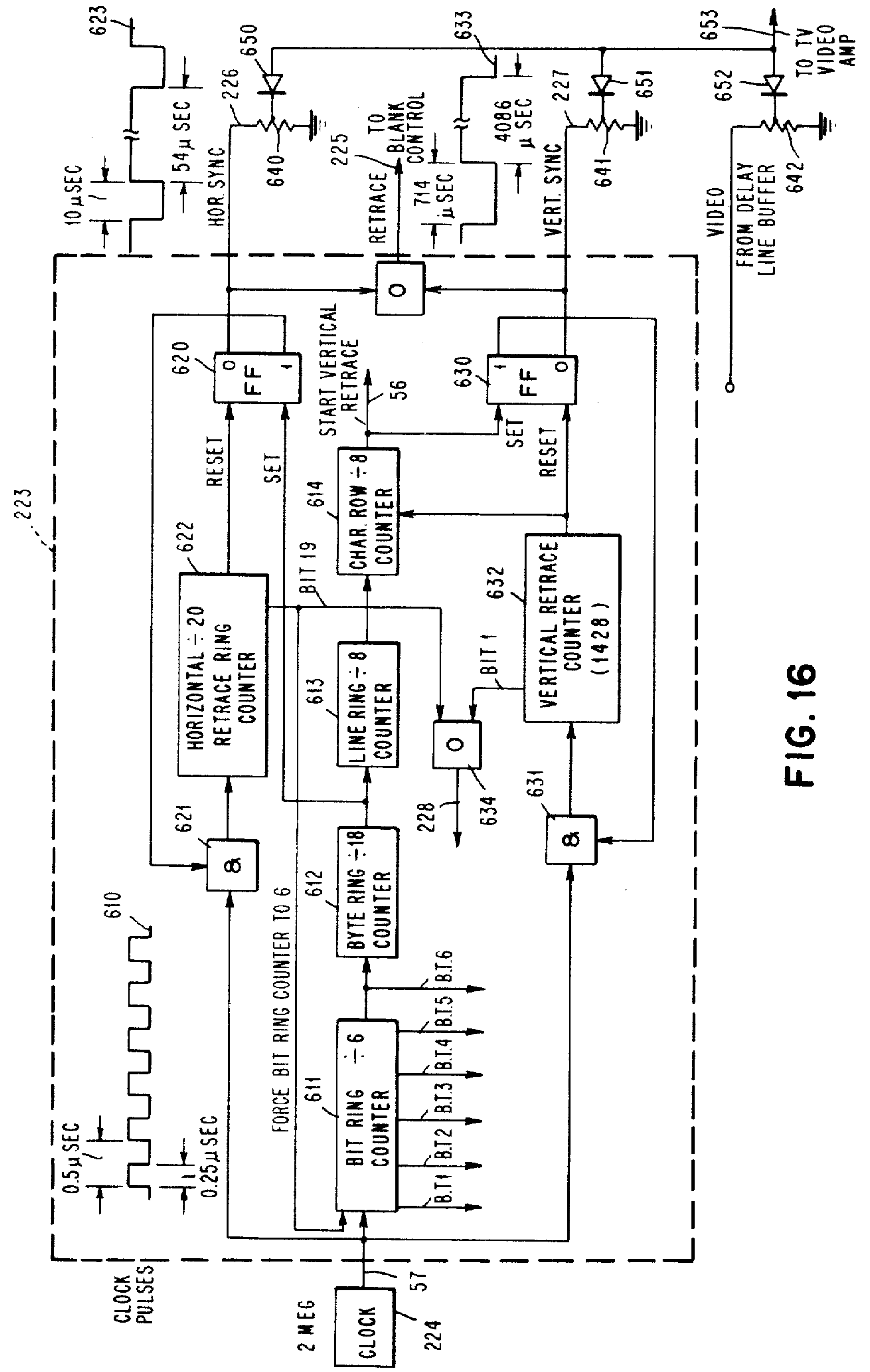
FIGURE 16 is a block diagram which illustrates in detail the horizontal and vertical timing control shown in block form in FIGURE 3.

Reference is made to FIGURE 16 which illustrates in detail the horizontal and vertical timing control 223 in FIGURE 3. FIGURE 16 is a block diagram schematic of one manner in which timing pulses may be generated to operate the TV displays 220 through 222 in FIGURE 3 as well as the remainder of the system illustrated in FIGURES 2 through 4. The clock 224 in FIGURE 16 is operated at 2 megacycles and supplies clock pulses which are 0.25 microsecond wide and occur every 0.5 microsecond as illustrated by the wave forms at 610 in FIGURE 16. The closk pulses are supplied to a bit ring counter 611 which may be a conventional six stage ring circuit which provides output pulses in sequential fashion to the lines labeled bit time (B.T.) 1 through 6. Bit time pulse 6 from each cycle of the bit ring counter 611 is supplied to and counted by a byte ring counter 612 which may be an 18 stage ring circuit. The bit ring counter 611 supplies output pulses at the clock rate for each dot time illustrated in the coordinate map of FIGURE 13. The byte ring counter 612 counts the number of bytes in a horizontal line which count also represents the maximum number of characters which may be displayed horizontally. The output pulses from the byte ring counter 612 are supplied to and counted by a line ring counter 613 which may be an eight stage ring circuit. A full count of eight represents the total number of horizontal lines required to display a complete character. FIGURE 14 illustrates that 8 horizontal lines are required to generate a complete character. When eight pulses have been received from the byte ring counter 612, the line ring counter 613 supplies a pulse to a character row ring counter 614 which count represents the number of rows of characters displayed. FIGURE 14 illustrates that there are 8 horizontal rows of characters. Thus the character row ring counter 614 has eight stages. When the character row ring counter 614 counts to a value of eight, a signal is developed on the ouput line 56 to start vertical retrace.

Since a complete TV raster is generated in 4800 microseconds, the clock 224 supplies 9600 pulses during this period. Thus it is seen that the bit ring counter cycles 1600 times for each TV raster; the byte ring counter 612 cycles 200 times per raster; and the line ring counter 613 cycles 25 times per raster. Accordingly, these counters need not be reset at the commencement of the generation of the next raster since they return to the proper point automatically. The character row ring counter 614, however, must be reset when the generation of the next raster comences because it counts three character rows during retrace, and this count must be eliminated when the generation of the next raster begins. It is reset when the vertical retrace is terminated as pointed out below.

When the byte ring counter 612 provides an output pulse to the line ring counter 613, this output pulse is applied to the one input side of a flip-flop 620, thereby setting this flip-flop. The one output side of the flip-flop 620 supplies a positive signal level which conditions an And circuit 621 to pass clock pulses to a horizontal retrace ring counter 622. The 19th pulse of ring counter 622 forces counter 611 in step for the beginning of the next line by forcing it to ring position 6. The horizontal retrace ring counter 622 is a twenty-stage ring circuit which counts twenty clock pulses and supplies a signal on the twentieth clock pulse to the zero input side of the flip-flop 620, thereby resetting this flip-flop. The output taken from the zero output side of the flip-flop 620 is a negative pulse having a width of 10 microseconds and occurring every 54 microseconds as illustrated by the wave forms 623 in FIGURE 16.

When vertical retrace is started by a positive output pulse on the line 56 from the character row ring counter 614, a flip-flop 630 is set to the one state, and this conditions an And circuit 631 to pass clock pulses to a vertical retrace counter 632. This counter must count 1428 pulses to provide a delay of 714 microseconds. Thus a counter, not a ring circuit, is employed because of the high count involved. An output pulse from the vertical retrace counter 632 resets the flip-flop 630 and resets the character row ring counter 614. The zero output side of the flip-flop 630 provides a vertical retrace pulse which is a negative signal level 714 microseconds in duration which occur every 4086 microseconds as illustrated by the wave forms 633. Each TV display terminal includes a set of resistors 640 through 642 connected as shown through respective diodes 650 through 652 to an output line 653. Horizontal sink signals, vertical sink signals, and video signals are combined to form a composite signal on the output line 653. Each TV display 220 through 222 in FIGURE 3 receives retrace, horizontal and vertical control signals on respective lines 225 through 227 from the horizontal and vertical timing control 223 in FIGURE 16, and each TV display terminal forms its own composite signal. The composite signal is supplied to the video amplifier of each television display. A commercially available television set may be employed. The composite signal is injected in the TV set at the point where the output of the detector normally feeds the TV video amplifier, and it may be advisable to disconnect the detector from the video amplifier before injecting the composite signal. This is a precaution to protect the detector diode. The vertical size control and the horizontal size control of a commercial television set may be adjusted to vary the size of the television display. It may be necessary in some instances to change the potentiometers in the vertical and horizontal size control circuits in order to obtain additional range.

Marker pulses for initial insertion in the delay line buffers are supplied by the horizontal retrace ring counter 622 and the vertical retrace counter 632 to an Or circuit 634. The horizontal retrace ring counter 622 supplies a positive pulse from its stage 19 to the Or circuits 634 during each vertical retrace, and the vertical retrace counter 632 supplies a positive signal from its first stage to the Or circuit 634 during each vertical retrace. These signals are stored in the delay line buffers when, as explained in the description of FIGURE 9, the operator depresses the switch 544 in FIGURE 9.

Reference is made to FIGURES 2 through 4 for a description of the operation of the system. It is assumed for purposes of illustration that an operator at each terminal types a message for display at each terminal. The polling circuit 32 in FIGURE 2 services each keyboard 20 through 22 one at a time in turn, and this permits each operator to display one character at a time at his terminal. In this fashion multiple messages may be typed and displayed simultaneously. More specifically, a message from keyboard 20 in FIGURE 2 is typed and displayed on the TV display 220 in FIGURE 3 simultaneously as different messages are typed from the keyboards 21 and 22 and displayed on associated TV displays 221 and 222 in FIGURE 3.

In order to demonstrate the events which take place when a key is operated, assume that a key at keyboard 20 has been depressed. When the polling circuit 32 in FIGURE 2 reaches the keyboard 20 for servicing, the polling circuit 32 supplies a positive signal level on the output line 29 to the And circuit 26 in FIGURE 2, and this permits BCD signals, established on the conductors of the cable 23 when the key is depressed, to pass through the And circuit 26 along the conductors of the cable 35 to the Or circuit 38. These BCD signals are supplied through the Or circuit 38 along the conductors of the cable 39 to the Or circuit 41. All BCD characters have at least one binary 1, and any binary 1 causes a positive signal level to be supplied on the conductor 44 to the Or circuit 45 and along the conductor 34 to stop the polling circuit 32. Holding the polling circuit 32 insures that BCD signals from the keyboard 20, which is locked each time a key is depressed, are made available sufficiently long for conversion and storage in the associated delay line buffer. Signals on the conductors of the cable 39 are supplied through the Or circuit 40 and along the conductors of the cable 43 to the composer 100. Also, the signals on the conductors of the cable 39 are supplied to the Or circuit 101 and along the conductors of the cable 103 to the parallel-serial converter 104. The positive signal on the line 29 from the polling circuit 32 is supplied to the marker bit control 203 in FIGURE 3. This causes the marker bit control 203 to locate the next marker bit, video or BCD. If a video marker bit is located, a video writing operation is initiated. If a BCD marker bit is located, a BCD writing operation is initiated. Since polling is always initiated with the start vertical retrace pulse and polls only once per delay-line cycle, a BCD marker will always be located first. When a BCD marker bit is located, a positive pulse is supplied on the output line 211 in FIGURE 3 through the Or circuit 210 and along the line 128 to the video and BCD bit counter 105 in FIGURE 2. Also, the positive pulse on the line 211 in FIGURE 3 is supplied to the delay line buffer 200 for the purpose of destroying the marker bit which is located, as explained earlier with reference to FIGURE 6. Accordingly, BCD signals in serial form are supplied by the parallel-serial converter 104 in FIGURE 2 to the delay line buffer 200 in FIGURE 3, and these signals are stored in the two byte locations immediately following the marker bit.

The composer 100 in FIGURE 2 receives the BCD signals from the keyboard 20, decodes these signals, selects the character represented and writes the selected character in a selected one of the planes 1 through 7 in FIGURE 7 as explained earlier. At the point where the selected character is written in a given one of the planes 1 through 8 in FIGURE 7, the BCD input signals are no longer needed by the composer 100, and the keyboard 20 may be unlocked at any time after this point in time. As soon as the first row of magnetic cores of the selected character has been read and transferred to the flip-flops 441 through 445 in FIGURE 7, the first video writing operation may take place. However, the marker bit control 203 in FIGURE 3 must detect the first video marker bit and set the writer flip-flop 390 in FIGURE 6. As soon as the write flip-flop 390 in FIGURE 6 is set, the bit counter generates the bit time pulses 1 through 6 for transferring the video signals from the flip-flops 441 through 445 in FIGURE 7 to the delay line buffer 200 in FIGURE 3 where they are stored. It takes seven such video writing operations to read all seven rows of the selected character after which all magnetic cores in the composer 100 are left in the reset state. Thus the composer is in condition to receive the next character from a selected keyboard. The video signals stored in the delay line buffer 200 are presented on the line 206 to the TV display 200 where the character is displayed, and it may be viewed by the operator. As soon as the horizontal and vertical timing control 223 in FIGURE 3 generates a positive pulse on the line 56, signifying the start of the next vertical retrace, the And circuit 53 in FIGURE 2 supplies a positive pulse on its output line 50 to unlock the keyboard 20. The positive signal on the line 50 in FIGURE 2 is supplied through the Or circuit 59, the And circuit 46, the Or circuit 48 and along the line 33 to start the polling circuit 32. As pointed out earlier, there is sufficient time delay in the mechanical process of unlocking the keyboard to insure that BCD signals from the keyboard supply a positive signal through the Or circuit 41 in FIGURE 2 to condition the And circuit 46 to pass the unlocked signal on the line 50 and initiate the starting of the polling circuit. The polling circuit is started before the keyboard 20 is in fact unlocked, and this prevents the operator at the keyboard 20 from typing a second character before keyboards 21 and 22 have been serviced. Each of the keyboards 20 through 22 may be operated one character at a time and serviced in turn. The foregoing events with respect to depressing a key at keyboard 20 occur very rapidly since the control circuits 2 through 4 are operated by a two megacycle clock, thereby providing control functions in the microsecond range. The data rate from keyboards of the fastest operators are much, much slower by comparison. Accordingly, a plurality of keyboards may be operated at the same time and be adequately serviced.

Let it be assumed that the operator at the keyboard 20 has typed, displayed and verified a complete message. He may transfer BCD signals representative of this message to the computer 260 in FIGURE 4 by depressing a release key which establishes a positive signal level on the output line 65 from the keyboard 20 in FIGURE 2. This signal level is conveyed through an Or circuit 250 in FIGURE 4 to the one input side of the flip-flop 251. This sets the flip-flop 251 to the one state and supplies a positive signal level to the computer 260 which signals attention. The positive signal level on the line 65 conditions the And circuit 253. The computer supplies a positive pulse on the line 256 to ascertain the identity of the originating station. This pulse is passed by the And circuit 253. The signals from the And circuits 253 through 255 are transferred to the buffer register 271, and this information is transferred along the conductors of the cable 294 in response to a positive pulse on the line 272 from the computer. The computer is thus informed of the identity of a terminal which has data to be transferred. Next, the computer selects the keyboard 20 of the originating terminal by supplying a positive signal level on the output line 54 in FIGURE 4 to the And circuit 51 in FIGURE 2. It also brings up a line called computer read to degate the marker bit input to the bit counter to prevent it from writing. As soon as the polling circuit supplies a positive signal on the output line 29 to the And circuit 51, this And circuit passes a positive signal through the Or circuit 45 and along the conductor 34 to stop the polling circuit 32. Thus, the originating terminal is selected. As soon as vertical retrace commences, a positive signal level is established on the output line 225 from the horizontal and vertical timing control 223 in FIGURE 3, and this signal level is supplied to the And circuit 289 in FIGURE 4. This conditions the And circuit 289 to pass clock pulses on the line 290 to the And circuit 286. Output signals from the delay line buffer 200 in FIGURE 3 are applied on the output line 206 to the And circuit 286 in FIGURE 4. Thus, transmission of BCD signals comences as soon as vertical retrace is initiated. It is recalled that BCD signals are stored in the delay line buffer during the retrace portion of the display cycle. The BCD signals supplied to the AND circuit 286 in FIGURE 4 are conveyed through the Or circuit 292 to the shift register 291. The shift register 291 is shifted to the left as data signals enter at the right. As soon as the shift register 291 receives one BCD byte, the content thereof is transferred to the buffer register 271. A buffer full indication enters Or circuit 263 and places a positive pulse on the line 130 designated data transfer request. The computer responds to this request and answers with a positive signal on the line 272. The content of the buffer register 271 is transferred to the computer 260 in response to a positive pulse on the line 272. Successive bytes of BCD data are thus transferred to the computer until a BCD marker bit is located. The positive signal on the line 29 from the polling circuit 32 in FIGURE 2 is supplied to the marker bit control 203 in FIGURE 3, and when the BCD marker bit is detected, a positive signal is established on the output line 215 in FIGURE 3. This signal passes through the Or circuit 218 in FIGURE 3 and along the line 219 to the computer 260 in FIGURE 4. A positive pulse on this line signals end response to the computer. Accordingly, the computer terminates transfer operation from the buffer register 271 along the cable 294 to the computer 260. Also, the computer terminates the positive level on the output line 54 to the And circuit 51 in FIGURE 2 and establishes a positive signal level on the line 64 to the And circuit 47 in FIGURE 2. Although the keyboard 20 does not require an unlock signal, such a signal is generated nevertheless. That is, the And circuit 53 supplies a positive signal on the output line 50 when a positive pulse is established on the line 56 representing the start of vertical retrace and a positive clock pulse appears on the line 57. The positive signal level on the line 50 is supplied through the Or circuit 59 to the And circuit 47 which passes this signal through the Or circuit 48 to start the polling circuit 32 in FIGURE 2. The computer terminates the positive signal level on the line 64, and computer read line, and the operation of transferring BCD data from the delay line buffer 200 in FIGURE 3 to the computer in FIGURE 4 is complete. After an operator presses his release switch and transfers data to the computer, the TV display may be canceled. For this purpose the operator may depress the cancel switch 540 in FIGURE 9, thereby destroying all signals in the delay line buffer 200. If the display is to be used for visually presenting other characters, the switch 544 in FIGURE 9 is operated, and this causes marker bits to be inserted at the appropriate places in the delay line buffer 200 as previously explained. A new message may be presented to the delay line buffer 200 from the keyboard or from the computer.

Let it be assumed for purposes of illustration that the information previously supplied to the computer 260 in FIGURE 4 requires an answer from the computer. When the answer has been determined and the computer is ready to transmit data for storage in the delay line buffer 200 in FIGURE 3, a positive signal is established on the line 54 in FIGURE 4 to the And circuit 51 in FIGURE 2. As soon as the polling circuit 32 supplies a positive signal on the output line 29, this positive signal is passed by the And circuit 51 through the Or circuit 45 to stop the polling circuit 32. The first BCD byte of information is transferred from the computer along the conductors of the cable 295 to the buffer register 102. The output of the buffer register 102 is supplied along the conductors of the cable 42 through the Or circuit 40 via the conductors of the cable 43 to the composer 100. The output of the buffer register 102 is supplied along the conductors of the cable 42 through the Or circuit 101 and along the conductors of the cable 103 to the parallel-serial converter 104. Video information from the composer 100 is written in the delay line buffer 200 in the manner explained above with reference to a writing operation from the keyboard 20. As soon as the write flip-flop 390 in FIGURE 6 is set to the one state, a positive signal level is established on hte output line 106 to the And circuit 120 in FIGURE 2. Since the line 29 to the And circuit 120 has a positive signal level, the output of the And circuit 120 is a positive signal level which passes through the Or circuit 129 in FIGURE 2 along the conductor 130 to the computer 260 in FIGURE 4. A positive signal on this line signifies to the computer that another BCD byte should be transferred to the buffer register 102 in FIGURE 2. Successive bytes are thus transferred, converted and stored in the delay line buffer 200 until the computer has transferred its complete message. It is pointed out the computer is capable of supplying BCD bytes at a very rapid rate. Accordingly, one byte from the computer may be stored during each cycle of the delay line buffer 200. In one embodiment constructed according to this invention the delay line buffer was designed with a complete cycle of 4800 microseconds. Thus it is seen that a message may be transferred from the computer to the delay line buffer of a terminal at a data rate which is much higher than the data rate of the keyboard. When the computer has completed its transmission, the positive signal on the line 54 in FIGURE 4 to the And circuit 51 in the FIGURE 2 is terminated, and a positive signal is established on the line 64 to the And circuit 47 which starts the polling circuit 32. The information thus transferred from the computer to the delay line buffer 200 in FIGURE 3 may be viewed on the TV display 220 by the operator.

While the invention has been particularly shown and described with reference to a preferred embodiment thereof, it will be understood by those skilled in the art that various changes in form and details may be made therein without departing from the spirit and scope of the invention. For example, while a serial type polling circuit has been shown in the preferred embodiment, it is pointed out that other types of selection devices for servicing a selected terminal upon request or on another priority basis may be substituted, and display devices other than the TV raster type of display device illustrated in the preferred embodiment may be employed.

What is claimed is:

1. A display system comprising:

a plurality of terminals, each terminal including: (1) a keyboard device, said keyboard device having a plurality of keys and means for generating a byte of digital coded signals representative of a symbol or character whenever a key is operated, (2) a cyclical storage device for storing video signals, (3) a television type display device including means for generating horizontal and vertical sweep signals to provide a raster, and (4) means connecting said cyclical storage device to said display device, said cyclical storage device supplying video signals for controlling the visual presentation on said display device, a composer, said composer including means for converting a byte of digital coded signals representative of a symbol or character to video signals which generate such symbol or character when applied to the television type display device, first control means connected between the composer and each terminal for connecting the composer between the keyboard device and the cyclical storage device of any terminal wherein one key on the keyboard has been operated, and second control means connected between the composer and each terminal for disconnecting the composer from the keyboard device and the cyclical storage device of any terminal after any key on the keyboard has been operated.

2. A display system comprising:

a plurality of terminals, each terminal including a keyboard, a cyclical storage device, and a display device, said display device including symbol generating means, means connecting the cyclical storage device to the display device for controlling the visual presentation thereon, said keyboard including a plurality of keys and means for generating digital coded signals representative of a symbol or character whenever a key is operated, a composer, said composer including means for converting digital coded signals to video signals for controlling the symbol generating means, first means coupled between the composer and each terminal for connecting the composer between the keyboard and the cyclical storage device of a selected terminal, and second means connected between the composer and each terminal for disconnecting the composer from the keyboard and the cyclical storage device of the selected terminal after one key of the keyboard is operated.

3. A display system composed of:

a plurality of terminals, each terminal including a display device having a picture frame period of a predetermined time duration, a cyclical buffer storage device having a cycle period equal to the predetermined time duration of the picture frame, means connecting said cyclical buffer storage device to said display device, and a keyboard including a plurality of keys and means for generating coded digital signals representative of symbols upon operation of a key, a composer, said composer including means for converting coded digital signals to video signals, first means for connecting the composer between the keyboard and the cyclical buffer storage device of a selected terminal, and second means for disconnecting the composer from the keyboard and the cyclical buffer storage device of the selected terminal, said second means including additional means for inhibiting operation of the keyboard after one key of said keyboard has been operated.

4. The apparatus of claim 3 wherein the cyclical buffer storage device is a recirculating delay line.

5. An arrangement including a data processing system and a display system, the display system including a plurality of terminals, each terminal including a keyboard device, said keyboard device having a plurality of keys and means for generating a set of digital coded signals representative of a symbol or character whenever a key is operated, a buffer storage device, and a display device connected to said buffer storage device, said display system further including a composer which is time-shared by said plurality of terminals, said composer including means for converting a set of digital coded signals from one form to another, first means which selectively connects the composer between the keyboard and the buffer storage device of any terminal, second means which disconnects the composer from a selected terminal after one symbol has been received, said data processing system including third means coupled to said first means for connecting the composer to a selected terminal, said data processing system further including fourth means for the transmission of a plurality of sets of coded digital signals from the data processing system through said composer to the buffer storage device of the selected terminal.

6. The apparatus of claim 5 wherein means is provided to lock any keyboard when one of its keys is operated, said first means includes a polling circuit which repetitively samples the terminals and selects any terminal with a keyboard having an operated key, and said second means includes logic circuit means for supplying a signal to unlock a keyboard in the selected terminal in response to a timed signal and a control pulse which signifies that the composer has completed its conversion operation.

7. The apparatus of claim 6 wherein the buffer storage device is a recirculating delay line, and the display device and the recirculating delay line have repetitive cycles of operation which are equal in time duration.

8. An arrangement including a data processing system and a display system, the display system including a plurality of terminals, each terminal including a keyboard device having a plurality of keys and means for generating a byte of digital coded signals representative of a symbol or character whenever a key is operated, a buffer storage device, and a display device connected to said buffer storage device, said display system further including a composer, said composer including means for processing a byte of said digital coded signals by converting such signals from one form to another, first means for selectively connecting the composer between the keyboard device and the buffer storage device of a given terminal, and second means for disconnecting the composer from such given terminal after processing the byte of said digital coded signals, and said data processing system including third means coupled between the data processing system and the first means, said data processing system operating said third means to connect the composer to a selected terminal for (1) the transmission of a plurality of signals from the data processing system through the composer to the buffer storage device or (2) from the buffer storage device to the data processing system.

9. The apparatus of claim 8 wherein the buffer storage device is a recirculating delay line having a cycle duration of a given time period, and the display device is a television type display having a picture frame cycle related to the given time period of the cycle of the recirculating delay line.

10. The apparatus of claim 8 wherein the first means includes a polling circuit for polling each terminal in sequence, said polling circuit selecting any polled terminal with an operated key on its keyboard.

11. A circuit arrangement including:

a plurality of terminals, each terminal including a keyboard device, said keyboard device including a plurality of keys and means for generating a byte of digital coded signals representative of a symbol or character whenever a key is operated, a cyclical storage device, and a television type display device including generator means for generating horizontal and vertical sweep signals to provide successive picture frames, said cyclical storage device being connected to supply video signals to said display device for controlling the visual presentation of said display device, said circuit arrangement further including a composer, said composer having an input side and an output side, means connected between the input side and the output side of said composer for converting digital coded signals representative of a character or symbol supplied to said input side to video signals at the output side, first control means for connecting the input end of the composer to the keyboard device of the various terminals selectively on a time-share basis, and second control means for connecting the output end of the composer to the cyclical storage means and the same terminal in synchronism with said first control means, and third control means for disconnecting the input end and the output end of the composer from any terminal when one byte of said digitally coded signals at the input side has been supplied as video signals at said output side to said cyclical storage device.

12. The apparatus of claim 11 wherein said third means includes logic circuit for disconnecting the input end and the output end of said composer from any selected terminal in response to a signal from said generator means signifying the end of a picture frame of said display device.

References Cited

UNITED STATES PATENTS

| | | | |
|---|---|---|---|
| 3,165,045 | 1/1965 | Troll | 95—4.5 |
| 3,323,119 | 5/1967 | Barcomb et al. | 340—324 |
| 3,345,458 | 10/1967 | Cole et al. | 178—6.8 |

ROBERT L. GRIFFIN, *Primary Examiner.*

RICHARD K. ECKERT, Jr., *Assistant Examiner.*

U.S. Cl. X.R.

340—172.5, 324.1